United States Patent
Gilbert et al.

(10) Patent No.: US 7,349,830 B2
(45) Date of Patent: Mar. 25, 2008

(54) WEATHER PROFILES

(75) Inventors: Michael Travis Gilbert, Snohomish, WA (US); Niniane Wang, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 10/780,691

(22) Filed: Feb. 19, 2004

(65) Prior Publication Data

US 2005/0114102 A1 May 26, 2005

Related U.S. Application Data

(63) Continuation-in-part of application No. 10/716,701, filed on Nov. 20, 2003, now Pat. No. 7,077,749.

(51) Int. Cl.
*G06F 17/10* (2006.01)
(52) U.S. Cl. .......................................... 703/2; 345/633
(58) Field of Classification Search .................... 703/2; 702/3; 345/632, 633
See application file for complete search history.

(56) References Cited

U.S. PATENT DOCUMENTS

| 6,184,897 | B1 | 2/2001 | Gueziec et al. | |
| 7,269,539 | B2* | 9/2007 | Wang | 703/2 |
| 2005/0187741 | A1* | 8/2005 | Gilbert | 703/2 |
| 2006/0100784 | A1* | 5/2006 | Wang | 702/3 |

OTHER PUBLICATIONS

Treinish et al., L.A. Weather Forecasting for the 1996 Olympics, IEEE, Computer Graphics and Applications, vol. 16, Jul. 1996, pp. 10-13.*

Johnston, W.E. Computational and data Grids in large-scale science and engineering, Future Generation Computer Systems, vol. 18, Oct. 2002, pp. 1085-1100.*

Bowling et al., L.C. Simulation of high-latitude hydrological process in the Torne-Kalix basin: PILPS Phase 2(e): 1: Experiment description and summary intercomparisons, Global and Planetary Change, vol. 38, Jul. 2003, pp. 1-30.*

War Games at the War College on Personal Computers, Defense Electronics, pp. 1-2; Apr. 1964.

AVSIM Online Main Page!, Today's Headlines Thursday-Nov. 20, 2003, http://www.avsim.com/pages/main_page.shtml, pp. 1-7, Nov. 20, 2003.

XPLANE Update, The X-Plane Flight Simulator Community, http://www.x-plane.org/ pp. 1-2, Nov. 20, 2003.

simMarket.com, Flight Simulation Super Store, www.simmarket.cor, http://secure.simmarket.com/, pp. 1-2, Nov. 20, 2003.

The Gold Guide @ Gone Gold, The Gold Guide By Genre, http://www.gonegold.com/gguide/index2.shtml, pp. 1-4, Nov. 20, 2003.

F. Altobelli et al., "Emergency Medical System Networked Simulation", SCAMC, Inc., pp. 999-1000, 1989.

(Continued)

*Primary Examiner*—Russell Frejd
(74) *Attorney, Agent, or Firm*—Banner & Witcoff, Ltd.

(57) ABSTRACT

Methods and systems for providing dynamic weather simulation in a computer gaming environment are disclosed. Weather may be user-specified, computer simulated, based on periodic updates of real-world weather conditions, or based on a pre-existing or user-created weather profile. A weather profile may include a data structure that stores weather over a location neutral geographical space, which may subsequently be applied dynamically to any selected geographical space in a simulated environment. To dynamically simulate weather while conserving computer resources, a weather simulation manager may periodically alter temperature and dew point values and determine whether to render or dissipate clouds based on the current temperature and dew point values.

20 Claims, 14 Drawing Sheets

OTHER PUBLICATIONS

J. Berssenbrügge et al., "Real-time Representation of Complex Lighting Data in a Nightdrive Simulation", The Eurographics Association, pp. 65-70, 2003.

A. B. Grigoriev, "Case Study for Natural Phenomena Visualization: Weather Effects", SPIE, vol. 3687, pp. 224-227, Linda Hall Library, Jan. 12, 2004.

B. M. Hand et al., "Computer Simulation in Introdoctory Geology", Computers & Geosciences, vol. 2, Pergamon Press, pp. 9-21, 1976.

M. Harrington, "Controlling Motion-Tracking Devices", Programmer's Toolchest, Dr. Dob's Journal, pp. 90-96, Mar. 1999.

F. C. Harris et al., "Road Construction —Simulation Game For Site Managers", Journal of The Construction Division, pp. 406-414, Sep. 1977.

L. Spirkovska et al., "AWE: Aviation Weather Data Visualization Environment", Computers & Graphics 26, pp. 169-191, 2002.

L. A. Treinish, "Multi-Resolution Visualization Techniques for Nested Weather Models", IBM Thomas J. Watson Research Center, Yorktown Heights, NY, lloydt@us.ibm.com, pp. 513-517, data unavailable.

L. A. Treinish, "Task-Specific Visualization Design: A Case Study in Operational Weather Forecasting", IBM Thomas J. Watson Research Center, Yorktown Heights, NY, lloydt@us.ibm.com, pp. 405-409, 576, 1998.

L. A. Treinish, "Visual Data Fusion for Applications of High-Resolution Numerical Weather Prediction", IBM Thomas J. Watson Research Center, Yorktown Heights, NY, lloydt@us.ibm.com, pp. 477-481, date unavailable.

* cited by examiner

WEATHER PROFILES

CROSS REFERENCE TO RELATED APPLICATIONS

This application claims priority from and is a continuation-in-part of Ser. No. 10/716,701, filed Nov. 20, 2003, U.S. Pat. No. 7,077,749, issued Jul. 18, 2006, entitled "Dynamic Weather Simulation".

FIELD OF THE INVENTION

The invention relates generally to weather simulation. More specifically, the invention provides dynamic weather scenarios to a computer user through the use of weather profile arrays defined with respect to an arbitrary geography and applied to a user-specified location.

BACKGROUND OF THE INVENTION

Weather simulation is a difficult process, evidenced by the rate with which weather forecasters and meteorologists provide incorrect weather forecasts. "Real world" weather simulation is a computationally expensive process due to the required 3-dimensional modeling of airflow, temperature, precipitation, and the like. Advanced weather simulation machines are generally comprised of supercomputers and high-end graphics workstations, above the price range of an ordinary consumer, and overkill for use in most computer and/or video games.

Due to the extensive advanced weather simulation requirements, present general purpose computers are not suited to perform advanced weather simulations. Advanced weather simulation on a general purpose computer, if possible, would consume all or a significant portion of the computer's resources during the simulation, leaving significantly less resources for other processes running on the computer.

Some computer programs in the simulation genre, however, depend on weather simulation to provide a realistic virtual world in which the simulation takes part. For example, some flight simulation games depend in part on the weather in which the user is flying to determine whether the user should fly under Visual Flight Rules (VFR) or Instrument Flight Rules (IFR). Whether a user is flying VFR or IFR will affect the user's actions, including instrument manipulation and communications with air traffic control (ATC). Some war simulation games and training software depend in part on weather to determine how far a player can see in the virtual world being simulated, which may affect military strategy. War simulation games may also depend on simulated precipitation when determining the range of launched projectiles (e.g., catapults, trebuchets, cannonballs, mortars, arrows and other non-propelled missiles, and the like). Large multiplayer online games which simulate virtual worlds over the course of weeks or even years may depend on simulating weather changes to add realism to the virtual environments.

Simulation games presently provide only a limited amount of weather simulation due to the large amounts of computer resources (e.g., processor time and memory) required to effectively simulate weather. For example, some known flight simulation games simulate only one weather type at a time. While weather can be different in different areas of the virtual world in which the user is flying, the weather will appear only of a single type at any given time. More specifically, if the user is flying in overcast skies with a ceiling of 4,000 feet, the virtual world will appear overcast with a ceiling of 4,000 feet in all directions from the user's present location. If the user subsequently flies into mostly sunny skies, the weather might change to mostly sunny skies, but it will do so in all directions. That is, even if the user looks behind his or her plane, the user will only see mostly sunny skies. The user will not see the overcast skies from which the user supposedly flew.

In attempts to make simulation games more real, some simulations games allow limited download of actual weather conditions for use during game play by downloading actual weather conditions prior to the start of a game, and subsequently using the downloaded weather conditions for the duration of the game. While this provides limited realism, it does not alleviate the problem where weather appears the same in all directions from the user's current location, nor does it provide changing and/or continuously real weather during the game.

Thus, it would be an advancement in the art to provide improved realism in weather simulation, including cloud formation and temperature changes, whereby multiple types of weather can be simulated at the same time, and whereby the weather simulation is suitable for presentation on a general purpose computer system without over burdening the computer system such that the computer becomes unacceptably slow at performing other tasks. It would be a further advancement in the art to provide continuously updated real world weather throughout the duration of game play.

In addition to the above, simulation based computer games typically provide limited or no capabilities to provide user defined weather. Typically, a computer game might allow a user to select general weather, such as "sunny," "overcast," or "rainy," but not allow the user to specify how cloudy, how much rain, temperature, visibility (e.g., due to haze), wind, etc. In one known solution, Microsoft® Flight Simulator® 2002, a user could specify many of these condition on a per-weather-station basis. That is, for each actual weather station in the world, the user could specify simulated conditions at that weather station. However, a user could not subsequently save the weather information independent of the user's current flight.

A limitation of Flight Simulator 2002 is that the user-specified conditions only apply to the specified weather stations. If the user wanted to fly through similar conditions in a different area of the world, the user would have to re-specify the desired conditions at weather stations in the new location. In addition, weather stations are not evenly spaced throughout the world. For example, there are many more weather stations in the United States than in all of Africa. This provides uneven granularity when the user is defining weather in various places.

Thus, it would be an advancement in the art to allow a user to define weather in an arbitrary space and then apply the user-defined weather to a location specified by the user. It would be a further advancement in the art to allow a user to define weather with even granularity, regardless of the location in the world in which the weather is applied.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to providing weather profiles in a computer game. According to an aspect of the invention, a software storage medium stores computer executable instructions for graphically depicting weather defined in a pre-existing weather profile to a simulated geographical environment in a computer game. The software reads a data structure storing predefined location-neutral weather information, wherein the data structure comprises weather information for each of a plurality of cells in a multi-dimensional array. The software applies the weather information read from the data structure to a grid within the simulated geographical environment of the computer game based on a user's starting position within the computer game, and then the computer game graphically depicts weather based on a current position of the user within the grid.

According to another aspect of the invention, a data structure may be used to identify weather for simulation in a computer game. The data structure includes, for each of a plurality of cells in a first two-dimensional grid, a first data field storing weather information corresponding to an area of predetermined size in a simulated geographical environment of the computer game. Each first data field includes a plurality of sub-data fields, each defining a weather layer.

According to another aspect of the invention, a computer readable medium stores computer executable instructions for graphically depicting weather defined in a pre-existing weather profile to a simulated geographical environment in a computer game. The stored software reads a data structure storing predefined location neutral weather information. The data structure includes a plurality of weather layers for each cell in a two-dimensional array, and each cell corresponds to a simulated geographic area of predetermined size. The plurality of weather layers are selected from a set of layer types including a surface condition layer, a cloud layer, a temperature layer, a wind layer, and a visibility layer. The software applies the weather layers read from the data structure to a grid within the simulated geographical environment of the computer game centered on a user's starting position within the computer game, and the software graphically depicts weather in the computer game. The graphically depicted weather corresponds to the weather layers of a cell in which the user is currently located in the computer game within the grid.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
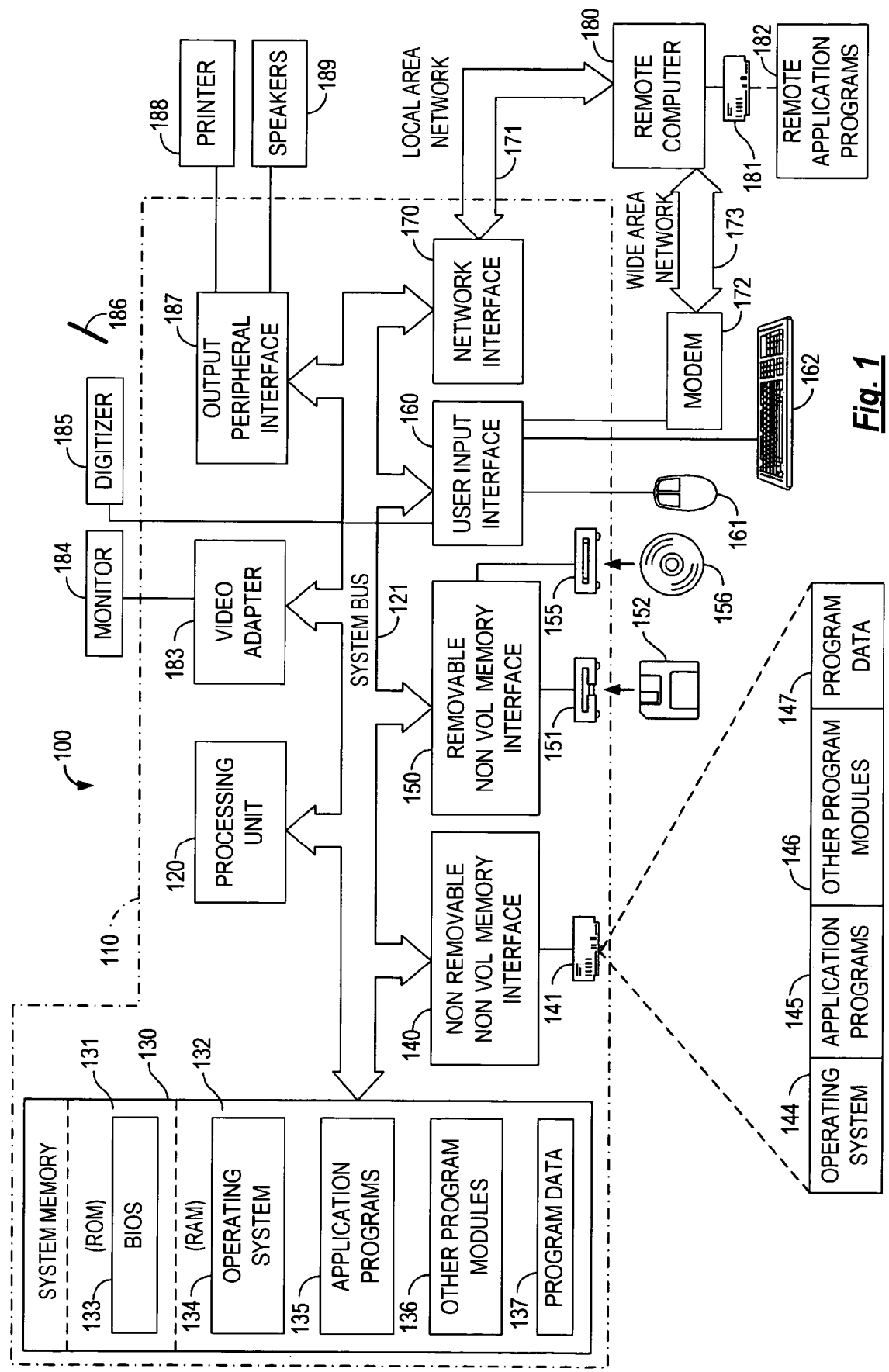
FIG. 1 illustrates a general operating environment suitable for one or more aspects of an illustrative embodiment of the invention.

FIG. 1 illustrates an example of a suitable general purpose computing system environment 100 on which dynamic weather may be simulated. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 184 or other type of display device is also connected to the system bus 121 via an interface, such as a video interface 183. Computer 110 may also include a digitizer 185 for use in conjunction with monitor 184 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

Illustrative Embodiments of the Invention

One or more aspects of the invention may be embodied in computer-executable instructions (i.e., software), such as in a weather simulation software object, routine or function (collectively referred to herein as a weather simulation manager) stored in system memory 130 or non-volatile memory 141, 152, 156 as application programs 135, 145, program modules 136, 146, and/or program data 137, 147. The software may alternatively be stored remotely, such as on remote computer 180 with remote application programs 182. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The weather simulation manager may be a component of a larger application program, such as a computer game that simulates weather as part of the gaming environment. Examples of such games may include, but are not limited to, flight simulation games, war simulations games, or any other game that takes place in a simulated virtual world. The larger application program might also be a computer based training application that trains users in a simulated real-world environment, or it may be any application program that simulates a virtual environment that relies in part on weather. The larger application program of which the weather simulation manager is a part may be referred to herein as the control program. As used herein, the term "computer game" refers to any game played on a personal computer, handheld computer, personal digital assistant, mobile phone, video game console, arcade game unit, and/or played on any other data processing device.

Figure 2:
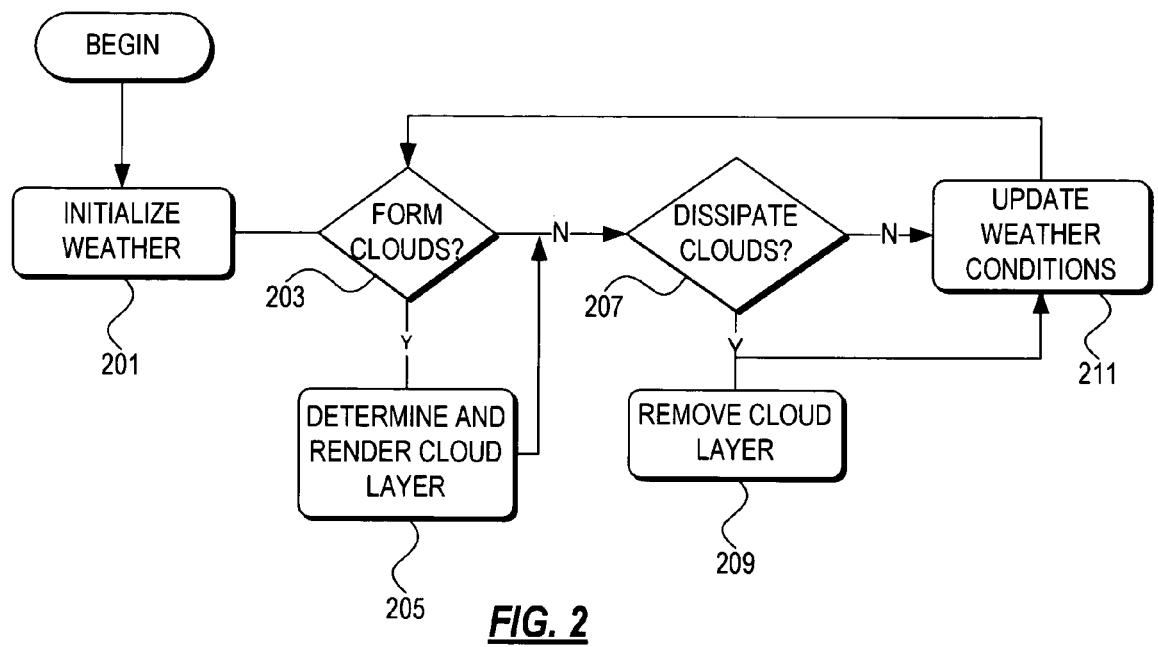
FIG. 2 illustrates a general method for dynamically simulating weather according to an illustrative embodiment of the invention.

With reference to FIG. 2, aspects of the invention may include a method for dynamic weather simulation. In step 201, the weather simulation manager initializes the weather, e.g., by obtaining or determining initial values for temperature and dew point for each of various regions in a simulated geographical environment (discussed in detail below). Next, in step 203, the weather simulation manager determines whether clouds should form in each region. If clouds should form in a region, the weather simulation manager causes the computer system to graphically depict, also referred to as render, a layer of clouds in that region, in step 205. Next, in step 207, the weather simulation manager determines, for each of the various regions, whether each existing cloud layer should dissipate. If so, in step 209, the weather simulation manager causes the computer system to dissipate the cloud layer determined to dissipate in step 207. In step 211, the weather simulation manager updates the weather conditions, e.g., including temperature and dew point, and returns to step 203. Each of these general steps will now be described in more detail.

Figure 3:
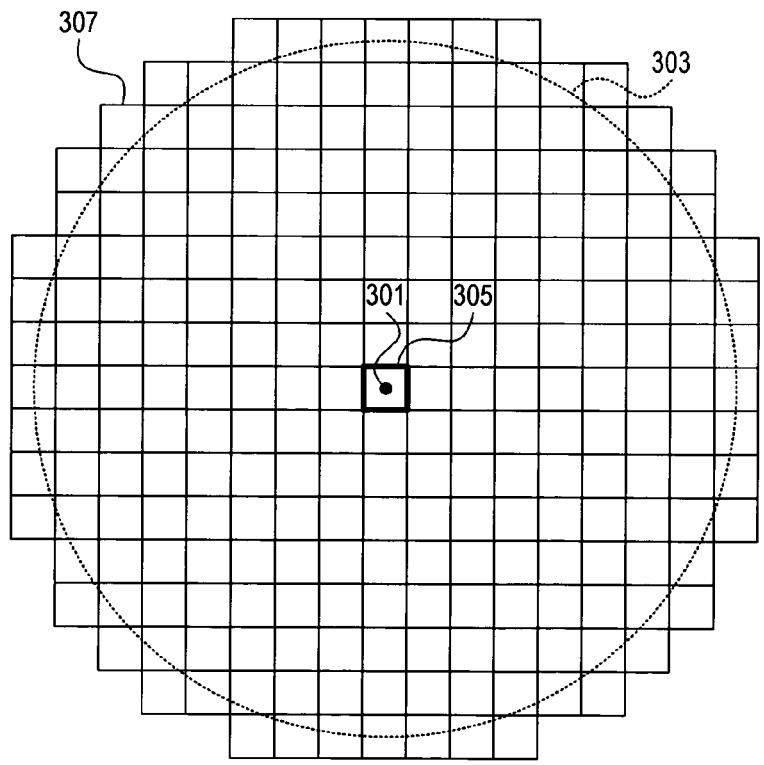
FIG. 3 illustrates a geographic cell grid that may be used to independently simulate weather over a geographic area according to an illustrative embodiment of the invention.

With reference to FIG. 3, the weather simulation manager may independently simulate weather using the method of FIG. 2 (as further described in detail below) for each of a plurality of cells 305 in a geographical grid 307. Each cell 305 of the grid 307 corresponds to a predetermined geographic area within the simulated virtual environment. Because the user typically cannot see every location in the simulated environment at the same time, the weather simulation manager might only simulate weather for those cells located adjacent to, within a predetermined distance of, or within a predetermined radius of the user's current position 301 or current cell 305. In an illustrative embodiment, each cell 305 may be a simulated 16 km×16 km area, extending away from the user in an approximately circular region 303 for a radius of 128 km. As the user moves within the simulated environment, cells may be added and removed from the set of cells for which weather simulation is performed as the cells come within and move beyond the predetermined distance, respectively. The cell sizes and predetermined distance may be increased or decreased, depending on the simulated visibility, performance capabilities of the computer system on which the weather simulation manager is running, and simulation regions other than circles may be used (e.g., rectangular, ellipse, triangular etc.).

In order to ensure that weather simulation does not affect other control program functions or other application programs running on the same computer system, the weather simulation manager may be allotted a predetermined amount of computer resources in which to perform weather simulation functions. In addition, the weather simulation manager might only perform weather simulation calculations for any given cell once within a predetermined amount of time, e.g., no more than once every ten seconds.

In an illustrative embodiment of the invention, the control program may allot the weather simulation manager a time slice, e.g., a fiber, every animation frame (preferably running at 30 frames per second or higher) in which the weather simulation manager can perform weather simulation functions. The weather simulation manager performs weather simulation calculations as described herein for as many cells within the region 303 as possible during each time slice. When the time slice is over, the weather simulation manager waits for the next allotted time slice and continues with the next cell in the region 303. Prior to performing weather simulation calculations for a cell, the weather simulation manager may check to see if the current cell has had weather simulation calculations performed within a predetermined amount of time (e.g., 10 seconds in this example) and, if so, skips the cell. Those of skill in the art will appreciate that any time slice allotment may be used, e.g., based on fibers, threads, time, and the like, and any predetermined amount of time, including zero, may be used as the delay for weather simulation calculations for each cell.

Because the weather simulation manager performs weather calculations for each cell seaparately, different weather may be simulated in neighboring cells. This provides an increased sense of realism to the user because the weather simulation manager more closely mimics real world weather. That is, a user facing one direction might see mostly sunny skies and no rain, whereas if the user looks in the opposite direction in the simulated environment the user might see overcast skies and rain.

The control program (e.g., a flight simulation game) may be divided into phases. In a setup phase, a user may set parameters which may be used to control a subsequent game play phase. With reference back to FIG. 2, in step 201 the control program and/or weather simulation manager, during the setup phase or at the very beginning of a game play phase, initializes current weather conditions for each cell in the virtual environment. The weather simulation manager initializes weather conditions for cells within the predetermined distance 303 of the user's starting position 301, and may also initialize global weather conditions outside that predetermined distance. Other ranges of cells for which weather conditions are initialized may alternatively be used. For each cell for which weather conditions are initialized, initial weather conditions may include surface conditions and winds aloft. Surface conditions may include, but are not limited to, temperature, dew point, wind speed, wind shear, wind turbulence and wind direction, cloud coverage (e.g., 0, ⅛, ⅔, . . . , ⅞; tenths may alternatively be used), cloud ceiling or base altitude, cloud height, cloud type, cloud turbulence, cloud icing, and atmospheric pressure. Winds aloft may include, but is not limited to, wind speed, wind direction, and temperature at altitudes from 3,000 feet up to 39,000 feet.

Weather initialization may be based on various sources. In one embodiment of the invention, with reference to FIGS. 6-11, the user may select a starting weather theme 603 from a weather menu 601. The control program may have a default weather theme. For example, in FIG. 6, if the user selects or the default weather is the "fair weather" theme 605, the weather might be initialized to 59 degrees Fahrenheit, ⅛ cloud coverage at 6,000 feet with a cloud height of 1,000 feet, and no surface wind.

Alternatively, when a user selects Real-world weather 607 or 609, weather may be based in whole or in part on actual weather. When the simulated environment is a simulation of actually occurring geography (e.g., the United States or elsewhere on Earth), the weather simulation manager may download current weather conditions from a remote database 182 (FIG. 1) over the Internet 173 or some other network 171. For example, the weather simulation manager may download surface weather conditions as METeorological Aerodrome Reports (METARs) provided by weather stations (other meteorological data providing reports may alternatively be used). METARs may be retrieved from Jeppesen Sanderson, Inc. of Denver, Colo. Alternatively, METARs may be retrieved from the National Weather Service. METARs are known in the art, and are available for approximately 6,000 weather stations in the world, approximately half of which are in the United States. For cells in which a METAR producing weather station is located, the weather simulation manager may use the data from that METAR producing weather station for that cell. For cells in which there is not a METAR producing weather station, the weather simulation manager may interpolate between METAR producing weather stations to arrive at the initial weather conditions for those cells.

If the user selects static Real-world weather 607, the weather simulation manager might download current weather conditions once prior to beginning game play, and subsequent weather changes are as described below (not based on real weather). Alternatively, if the user selects auto-updated Real-world weather 609, the weather simulation manager might download current weather conditions prior to beginning game play, and download subsequent weather changes periodically during game play, e.g., every 15 minutes. The weather may transition gradually to the newly downloaded weather over several minutes, rather than jumping abruptly to the new weather, as further described below. Weather may or may not change in-between real weather download intervals.

Figure 7:
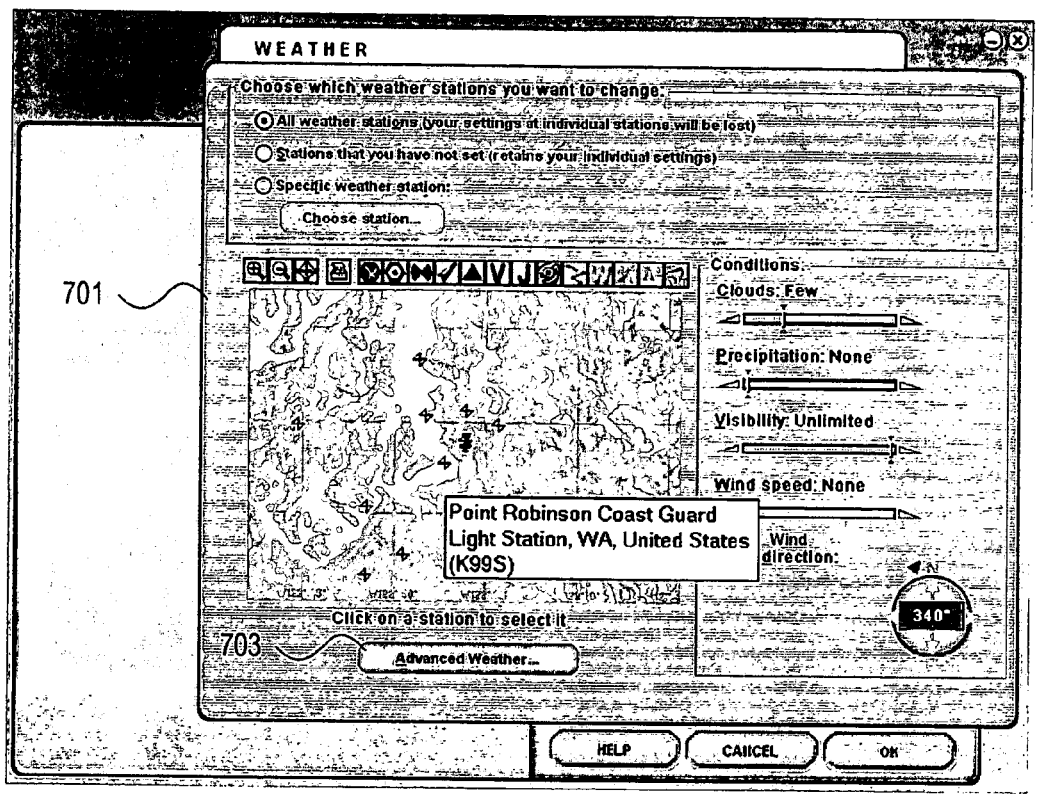
FIG. 7 illustrates a customized weather menu according to an illustrative embodiment of the invention.

The user may alternatively select User-defined weather 613, which may launch a custom weather menu 701, illustrated in FIG. 7. Custom weather menu allows the user to change general weather conditions for any or all weather stations for which weather METARs may be received. The user may select an advanced weather option 703 to change more specific weather conditions.

Figure 8:
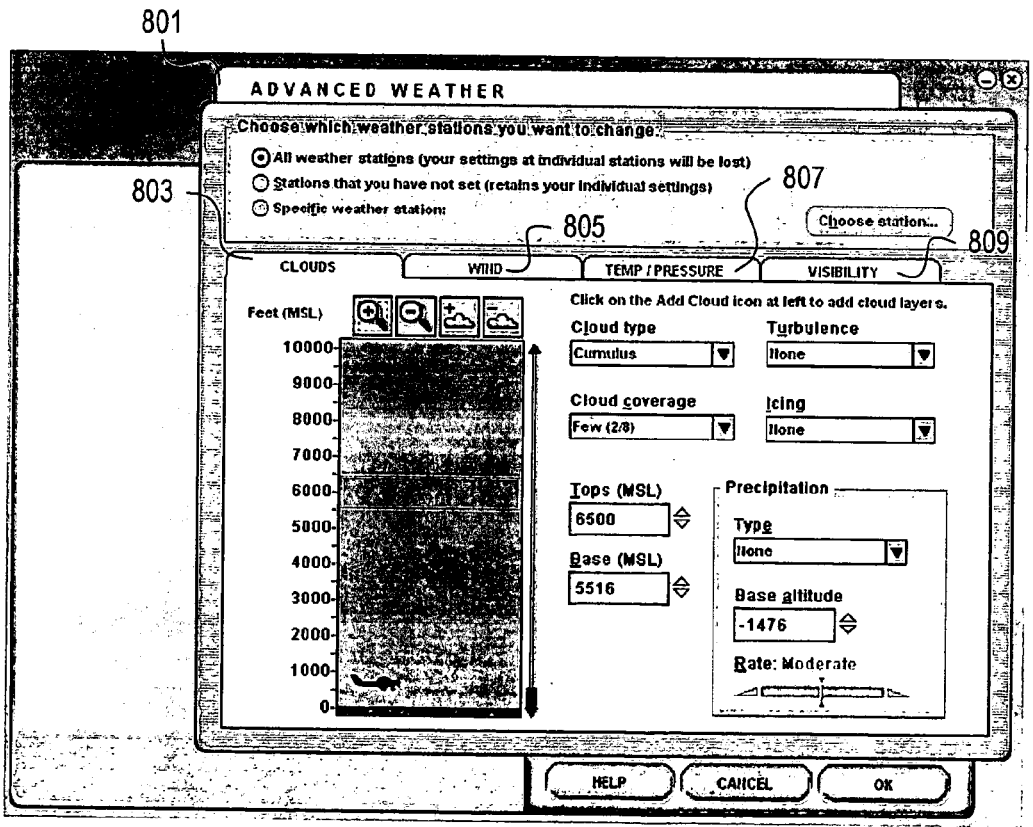
FIG. 8 illustrates an advanced weather menu and a cloud submenu according to an illustrative embodiment of the invention.
Figure 9:
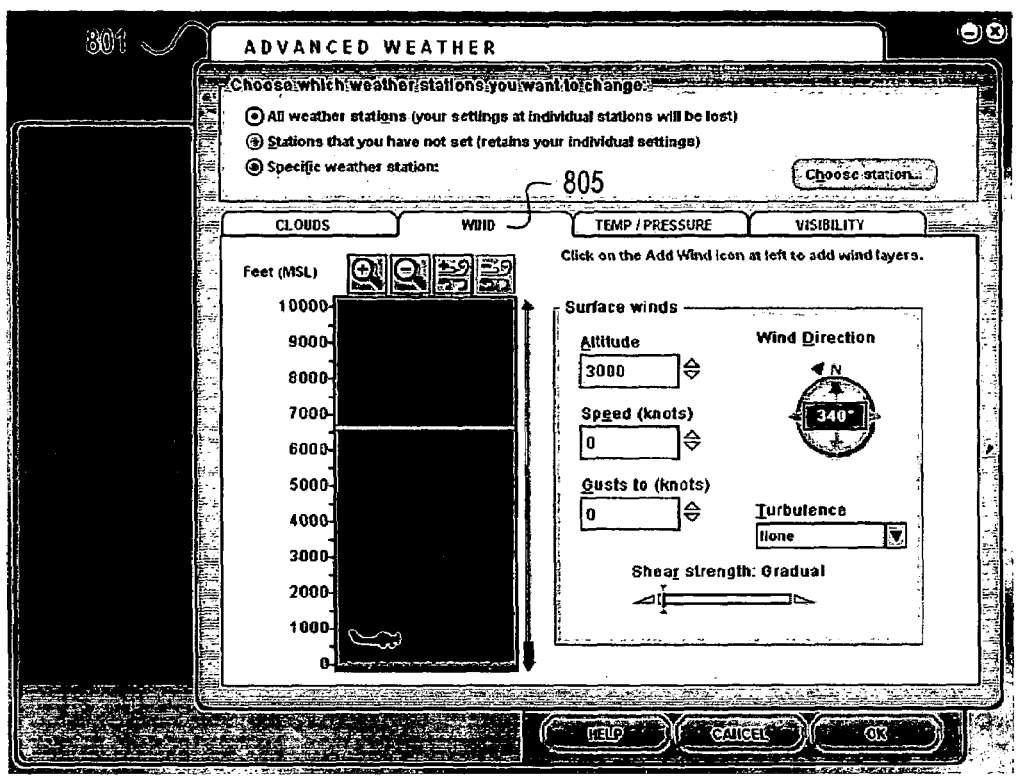
FIG. 9 illustrates an advanced weather menu and a wind submenu according to an illustrative embodiment of the invention.
Figure 10:
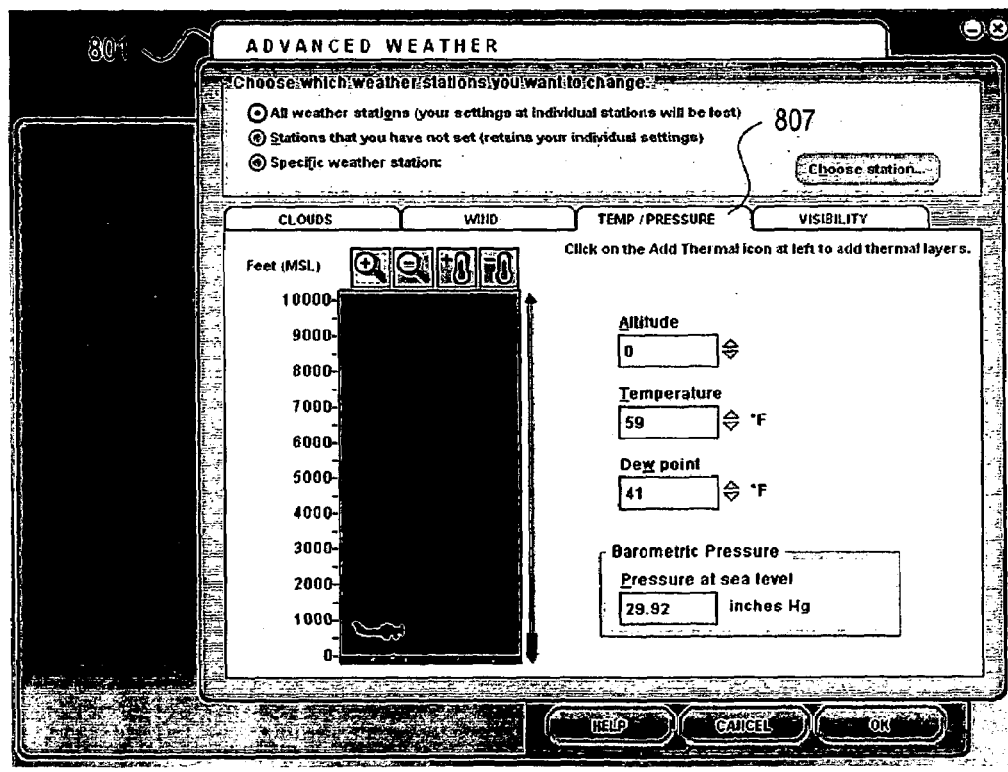
FIG. 10 illustrates an advanced weather menu and a temperature/pressure submenu according to an illustrative embodiment of the invention.
Figure 11:
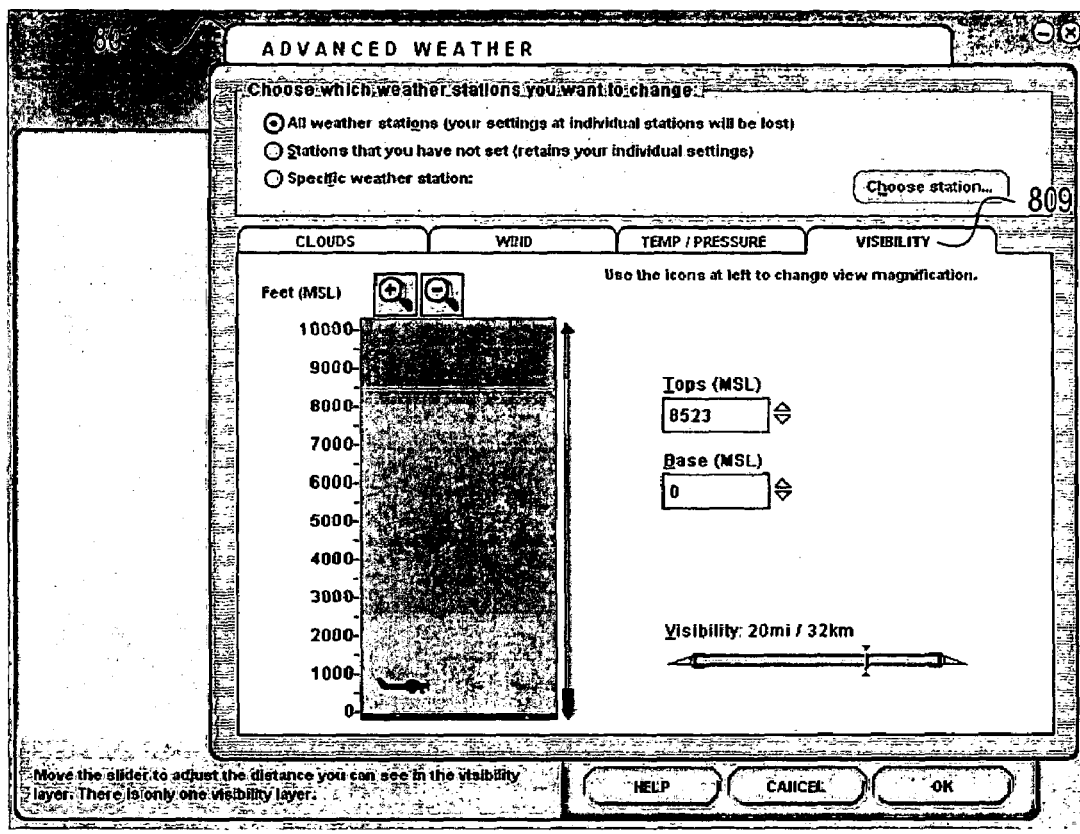
FIG. 11 illustrates an advanced weather menu and a visibility submenu according to an illustrative embodiment of the invention.

Upon selection of advanced weather option 703, the control program or weather simulation manager launches an advanced weather menu 801, illustrated in FIG. 8, where the user can change specific weather conditions, including clouds, wind, temperature/pressure, and visibility, for any or all of weather stations for which weather METARs may be received. Each of clouds, wind, temperature/pressure, and visibility may have a sub-menu or tab 803, 805, 807, 809, respectively, through which the user can edit specific details for each respective condition. FIG. 8 illustrates the advanced weather menu 801 and cloud sub-menu 803, through which the user may be able to specify meteorological conditions for cloud type, cloud coverage, cloud tops, cloud base, turbulence, icing, and precipiation. FIG. 9 illustrates the advanced weather menu and wind submenu 805, through which the user may be able to specify meteorological conditions for wind altitude, wind speed, wind gusts, wind turbulence, shear strength, and wind direction. FIG. 10 illustrates the advanced weather menu and temperature/pressure submenu 807, through which the user may be able to specify meteorological conditions for altitude and dew point for various altitudes, as well as barometric pressure at sea level. FIG. 11 illustrates the advanced weather menu and visibility submenu 809, through which the user may be able to specify meteorological conditions for visibility at various altitudes. Within each submenu, the user may specify and/or modify weather conditions on a per weather station basis and/or for each of various altitudes, thus providing user-specified weather in three dimensions.

After initialization, the weather simulation manager begins weather simulation in step 203 by determining whether clouds should form in each cell within the predetermined distance of the user's current (starting) position. As indicated above, the weather simulation manager performs weather calculations for each cell separately (one of skill in the art will appreciate that weather for one cell may be based in part on weather in another cell, e.g., when the weather simulation manager interpolates a current cell's weather based on one or more weather stations located in one or more nearby cells). The method will be described with respect to a single cell, and those of skill in the art will appreciate that the same methods may be performed for each cell as applicable.

To determine if clouds should form in step 203, the weather simulation manager first determines a cloud formation probability for the cell. The cloud formation probability may vary depending on the spread between the temperature T and dew point DP (referred to herein as the T/DP spread). Because cloud formation is checked relatively often (e.g., once every ten seconds in the above example), the cloud formation probability is preferably low so that cloud formation mimics real weather. For example, in one illustrative embodiment, when the T/DP spread is zero, the cloud formation probability 0.04 results in only a 4% chance of a cloud forming per minute (or per weather calculation cycle, or per some other amount of time). When the probability is based per minute, and the weather calculation cycle is less than one minute, then the probability may be adjusted accordingly. For example, if a weather calculation cycle for a cell occurs 20 seconds after the previous weather calculation cycle for that cell, then the probability may be divided by 3 (20 sec./60 sec.=⅓). As the T/DP spread increases, the cloud formation probability approaches zero. For example, the cloud formation probability may have a small value, such as 0.0125%, when the T/DP spread is greater than a predetermined spread, such as 50 degrees Celsius. Other probabilities may alternatively be used.

Upon determining the cloud formation probability, the weather simulation manager generates a random or pseudo-random number, collectively referred to herein as a random number, between 0 and 1. If the random number is less than the cloud formation probability, the weather simulation manager forms a cloud layer in step 205. Otherwise, the weather simulation manager continues to step 207.

Figure 4:
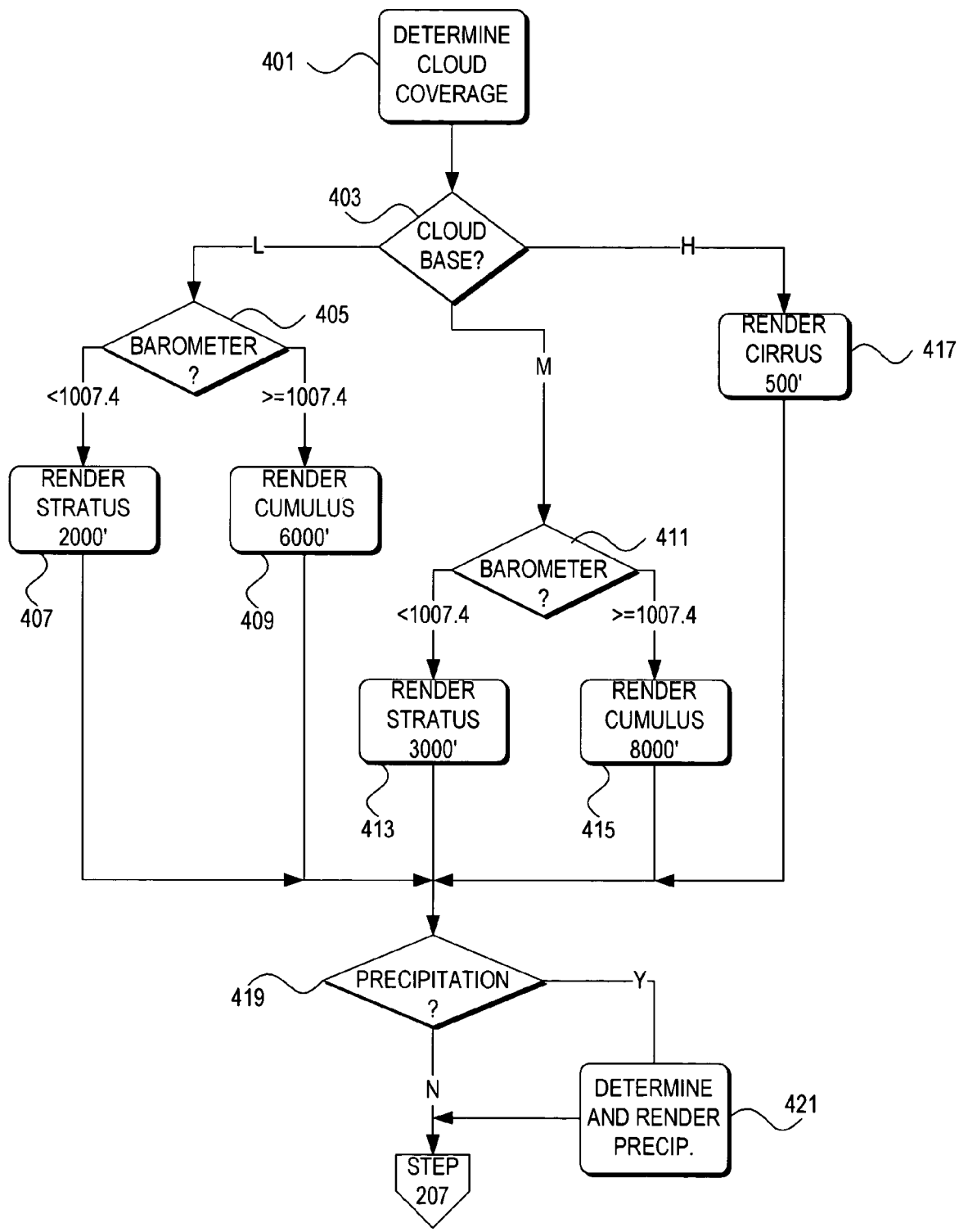
FIG. 4 illustrates a method for determining cloud formation information according to an illustrative embodiment of the invention.

In step 205, the weather simulation manager determines what type of cloud layer to form, at what base altitude, and with what height. FIG. 4 illustrates step 205 in more detail. In step 401, the weather simulation manager determines the cloud coverage with which the cloud layer should be drawn. Cloud coverage is typically determined based on the percentage of sky covered by clouds. For example, meteorologists sometimes refer to cloud coverage based on Table 1:

TABLE 1

| Fraction of sky covered by clouds | Cloud coverage description |
|---|---|
| 0/8 | Clear/Sunny |
| ⅛-2/8 | Few Clouds/Mostly Sunny |
| ⅜-4/8 | Scattered Clouds |

TABLE 1-continued

| Fraction of sky covered by clouds | Cloud coverage description |
|---|---|
| ⅝-⅞ | Broken/Mostly Cloudy |
| 8/8 | Overcast |

Alternatively, cloud coverage based on tenths or some other cloud coverage basis may be used, as is known in the art.

The weather simulation manager determines cloud coverage using Equation 1:

$$CC = CF_{Act}/CF_{Max} + R_{CC} \quad \text{(Equation 1)}$$

Where CC represents cloud coverage, $CF_{Act.}$ represents the actual cloud formation probability computed in step 203, $CF_{Max.}$ represents the maximum cloud formation probability when the T/DP spread is zero, and $R_{CC}$ represents a random factor, e.g., ±50%, that may be added to CC. CC may be rounded up or down to the nearest ⅛ or other applicable fraction. The actual value of CC may be used to determine how much of the sky in the applicable cell the cloud layer should fill.

In step 403, the weather simulation manager determines the cloud layer base altitude. The cloud layer base altitude may be determined using Equation 2:

$$CBA = ((T-DP) \times 1000/2.5) + R_{CBA} \quad \text{(Equation 2)}$$

Where CBA represents Cloud Base Altitude in feet, Temperature T and Dew Point DP are in degrees Celsius, and $R_{CBA}$ is a random number such that $-300 < R_{CBA} < 300$ feet, which provides for some randomness in the cloud base altitude. Other limits for the random number $R_{CBA}$ may alternatively be used, or $R_{CBA}$ may be set at zero to provide a uniform cloud base altitude. The Cloud Base Altitude may also be adjusted so that no two cloud layers overlap by more than a predefined amount, e.g., by no more than 60%. The constant value 2.5 represents an approximation of the temperature drop per 1,000 feet increase in altitude. Other approximations may be used, e.g., based on type of weather, degrees Fahrenheit versus degrees Celsius, etc. In one embodiment, 2.5 degrees per 1,000 feet may be used. Alternatively, 4 degrees per 1,000 feet may be a more accurate approximation in hot, sunny weather, whereas 2.5 degrees per 1,000 feet may be a more accurate approximation in cloudy, humid weather.

Finally, the weather simulation manager determines whether the cloud base altitude is low, medium, or high, and proceeds to steps 405, 411, or 417, respectively. Low, medium, and high cloud base altitudes may be determined based on the relationships indicated in Equation 3:

$$\text{Low} \leq 2,000 \text{ meters} < \text{Medium} \leq 6,000 \text{ meters} < \text{High} \quad \text{(Equation 3)}$$

Other values may alternatively be used to delineate between low, medium, and high cloud based altitudes.

In step 405, the weather simulation manager checks the current barometric pressure to determine what type of clouds to draw at low altitude. If the barometer is below 1007.4 millibars, then the weather simulation manager in step 407 renders a cloud layer of stratus type clouds at the determined cloud base altitude CBA with a predetermined height and according to the determined cloud coverage CC (i.e., the cloud layer covers the fraction of the sky determined by CC). The height may be statically set, e.g., to 2,000 feet, or the height may have an element of randomness. If in step 405 the barometer is greater than or equal to 1007.4 millibars, then the weather simulation manager in step 409 renders a cloud layer of cumulus type clouds at the determined cloud base altitude CBA with a predetermined height and according to the determined cloud coverage CC. The cloud height may be statically set, e.g., to 6,000 feet, or the height may have an element of randomness. Other barometer levels may be used as well.

If in step 403 the cloud base altitude falls within the medium range, the weather simulation manager checks the barometer in step 411 to determine what type of clouds to render. If the barometer is below 1007.4 millibars, then the weather simulation manager in step 413 renders a cloud layer of stratus type clouds at the determined cloud base altitude CBA with a predetermined height and according to the determined cloud coverage CC. The cloud height may be statically set, e.g., to 3,000 feet, or the height may have an element of randomness. If in step 411 the barometer is greater than or equal to 1007.4 millibars, then the weather simulation manager in step 415 renders a cloud layer of cumulus type clouds at the determined cloud base altitude CBA with a predetermined height and according to the determined cloud coverage CC. The cloud height may be statically set, e.g., to 8,000 feet, or the height may have an element of randomness.

If in step 403 the cloud base altitude falls within the high range, the weather simulation manager in step 417 renders a cloud layer of cirrus type clouds at the determined cloud base altitude CBA with a predetermined height and according to the determined cloud coverage CC. The cloud height may be statically set, e.g., to 500 feet, or the height may have an element of randomness.

The weather simulation manager may simulate a variety of stratus, cumulus, cumulonimbus, and cirrus type clouds. The weather simulation manager may select one type to render, as applicable, based on cloud base altitude and height, e.g., cirrostratus, altostratus, nimbostratus, stratocumulus, altocumulus, cirrocumulus, cumulonimbus, and the like.

After rendering the cloud layer, the weather simulation manager determines, in step 419, whether precipitation is associated with the cloud layer. The precipitation determination may be based in whole or in part on cloud height, and on whether the temperature falls within a precipitation range, e.g., −10° C. at cloud altitude. If there is no precipitation, the weather simulation manager may continue to step 207. If there is precipitation, the weather simulation manager in step 421, determines whether the precipitation is rain, snow or some other form of precipitation (e.g., sleet, hail, etc.), and renders the applicable precipitation in the simulated geographic environment. In one embodiment, there is a 1% chance of snow and a 4% chance of rain. The precipitation may fall to the ground, or the weather simulation manager may simulate virga by simulating the precipitation falling only a predetermined distance below the cloud base, e.g., the precipitation falls for 2,000 meters below the cloud base.

In step 207 the weather simulation manager determines whether clouds should dissipate, i.e., be removed from the visually depicted scenery of the simulated environment. The weather simulation manager may determine cloud dissipation similar to the determination of cloud formation. To determine if clouds should dissipate, the weather simulation manager determines a cloud dissipation probability for cash cloud layer of the cell. Similar to the cloud formation probability, the cloud dissipation probability may vary depending on the spread between the temperature T and dew point DP. Because cloud dissipation is checked relatively often (e.g., once every ten seconds in the above example), the cloud dissipation probability is also preferably low. For example, in one illustrative embodiment, when the T/DP spread is zero, the cloud dissipation probability may be zero. As the T/DP spread increases to a high value, such as 50 degrees Celsius, the cloud formation probability approaches a maximum value, e.g., 0.04 (4%) or 0.039875 (3.9875%) chance of cloud dissipation per minute (or per weather calculation cycle). Conversely, when the T/DP spread decreases to 0, the probability approaches a minimum value, e.g., 0%. In one embodiment of the invention, in order to provide realistic cloud formation and dissipation, the cloud dissipation probability is the inverse of the cloud formation probability with respect to the maximum probability value, calculated as follows:

$$CD_{Act} = CF_{Max} - CF_{Act} \qquad \text{(Equation 4)}$$

Where $CD_{Act}$ represents the cloud dissipation probability, $CF_{Act}$ represents the actual cloud formation probability computed in step 203, and $CF_{Max}$ represents the maximum cloud formation probability when the T/DP spread is zero. For example, if the maximum formation/dissipation probability $CF_{Max}$ is 0.04 (4%) and the current cell's cloud formation probability $CF_{Act}$ is 0.025 (2.5%), then the cloud dissipation probability $CD_{Act}$ would be 0.015 (1.5%). Those of skill in the art will appreciate that variations or other formulas may be used when determining cloud dissipation probabilities. The above formula is a representative example of a preferable manner in which to calculate cloud dissipation probabilities in a realistic manner.

Upon determining the cloud dissipation probability, the weather simulation manager generates a random number between 0 and 1. If the random number is less than the cloud dissipation probability, the weather simulation manager dissipates the existing cloud layer in step 209. Otherwise, the weather simulation manager continues to step 211. If the current cell for which weather calculations are being performed has no present cloud layers, steps 207 and 209 may be skipped for that cell, and the weather simulation manager may proceed directly from step 203/205 to step 211, as applicable.

If the weather simulation manager determines that the cloud layer should dissipate, then in step 209 the weather simulation manager slowly makes the cloud layer graphically disappear from the simulated environment. In one illustrative embodiment, where each cloud is comprised of a three-dimensional volume of sprites, the weather simulation manager may gradually increase a transparency level (e.g., the A-value in an ARGB scheme) of sprites located at edges of the cloud. As the edge sprites' transparency level is increased or near transparent, the weather simulation manager may increase the transparency level of sprites closer to the center of the cloud as the farther out sprites fade from view. That is, the weather simulation manager increases the transparency level of the sprites located at the cloud's outer extremes. As those sprites begin to fade or disappear completely, the weather simulation manager begins to increase the transparency level of the next set of sprites that are now located at the cloud's outer extremes as a result of the original set of sprites fading from view and disappearing.

In step 211 the weather simulation manager updates the current weather conditions. Weather conditions may be modified based on any number of variables and in any number of manners. The method in which the weather is updated is secondary to the cloud determinations calculated based on the updated weather each calculation cycle (e.g., every 10 seconds in the above example). The weather update schema described herein is merely an example of one way in which the weather may be updated. Those of skill in the art will appreciate that alternative weather update schemas may be used instead.

During each cycle (i.e., every 10 seconds in the above example), the weather simulation manager may update the temperature and dew point, while other meteorological conditions may remain constant. Other meteorological conditions may be updated when the control program or weather simulation manager retrieves updated weather information from the database over the Internet. The rate with which the temperature and dew point change each cycle may be based on a variety of factors including, but not limited to, the position of the sun in the sky and the current cloud coverage for the respective cell. As the sun goes up during the day, the temperature and dew point generally increase, whereas as the sun goes down during the day, the temperature and dew generally decrease. Similarly, the temperature and/or dew point may be more likely to change when there is little cloud coverage than when there is greater cloud coverage. In addition, the existing T/DP spread may be used as an indication of humidity, which may further affect the rates of change for temperature and dew point. Temperature and dew point may change independently of each other while following their respective increasing/decreasing trend.

While the trend for the change may be to generally increase or generally decrease over longer periods of time, each of the temperature and dew point may increase or decrease with each cycle. For example, during an increasing trend, the range with which the temperature and/or dew point can change may include a small probability of decreasing and a larger probability of increasing. The possible range of temperature change with no cloud coverage may be from −0.01 to 0.05 degrees per minute (or per weather calculation cycle), and the weather simulation manager may randomly select a value within this range by which to alter the temperature. Thus, while there is a possibility that the temperature may decrease, there is a much larger probability that the temperature will increase. The same or a different range may be used for the dew point and opposite ranges or other ranges weighted towards decreasing values may be used when the temperature and/or dew point trend is to decrease.

Figure 5:
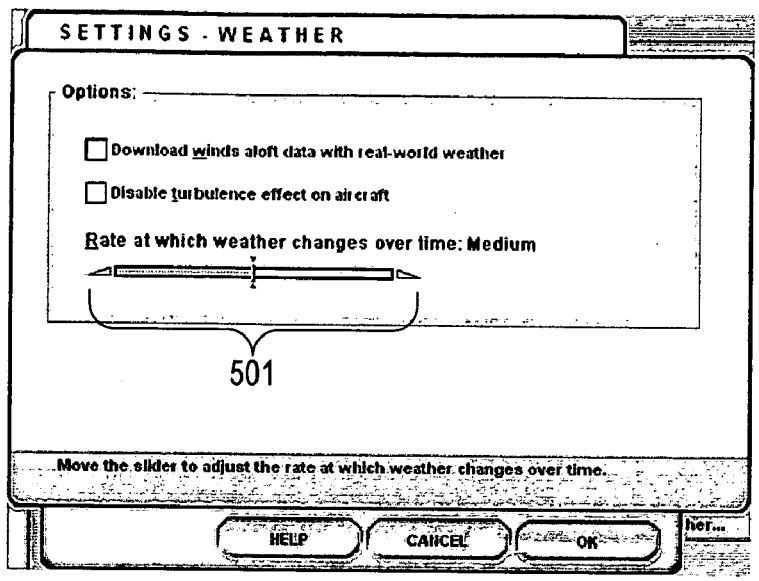
FIG. 5 illustrates a dynamic weather settings menu according to an illustrative embodiment of the invention.

As indicated above, the temperature and dew point changes may be based on the sun's position in the sky as well as on cloud coverage. Temperature and/or dew point changes may further be based on a 'reality' setting that alters the changes based on whether the changes should attempt to mimic real weather, be more extreme than real weather, or be milder than real weather. In one illustrative embodiment, with reference to FIG. 5, a user may set a dynamic weather variable 501 (e.g, a slider) to any of a plurality of positions, e.g., none, mild, medium, high, extreme. A default value may be set to the 'medium' setting, which attempts to mimic actual rates of change of real weather patterns. The mild setting may cause the rate of change to be less than real weather, and the none setting may cause temperature and dew point to remain constant throughout game play. The high setting may cause the rate of change to be more than real weather, and the extreme setting may cause rates of change to be a lot more than real weather (e.g., variations of 40 degrees Celsius per day).

The selected setting may act as a multiplier for the temperature and/or dew point change. For example, the none setting may multiply the temperature and/or dew point change by 0, resulting in no change; the mild setting may multiple the temperature and/or dew point change by 0.5, resulting in less change than real weather; the medium setting may multiple the temperature and/or dew point change by 1, resulting in real weather; the high setting may multiply the temperature and/or dew point change by 3, resulting in greater than normal temperature and dew point variations; and the extreme setting may multiply the temperature and/or dew point change by 10, resulting in extreme temperature and dew point variations as compared to real life. Alternatively, additional or different settings may be used, or the user may select any arbitrary multiplier within the range of valid multipliers.

When updating the weather in step 211, the weather simulation manager may perform one or more error checks including, but not limited to, ensuring that the dew point does not exceed the temperature. That is, the dew point should be lower than or the same as the temperature. If the weather simulation manager otherwise attempts to change the temperature and/or dew point in such a manner that the dew point would exceed the temperature, the weather simulation manager forces the dew point and temperature to the same value (e.g., either the calculated temperature or dew point, or some range in between), or forces the dew point to be less than the temperature. In addition, the weather simulation manager may ensure that the temperature, at ground level never exceeds or falls below a certain temperature range. For example, the weather simulation manager may ensure that the temperature T at ground level stays within the range $-50°$ C. $\leq T \leq 50°$ C.

If the user, prior to beginning game play or dynamically in the middle of game play, selects updated Real-world weather 609 (FIG. 6), the weather simulation manager may retrieve updated real world weather conditions from the database over the Internet at regular intervals, e.g., every 15 minutes. The regular intervals in which weather is retrieved from the database are generally much larger than the cycle intervals in which the weather simulation manager updates weather for each cell (e.g., approximately every 10 seconds in the above example). Therefore, there is a likelihood that the simulated weather will be quite different from the real-world weather by the time the next real world weather update occurs. This is especially the case when the user's dynamic weather setting 501 (FIG. 5), 611 (FIG. 6) is set to other than the medium setting.

Thus, in one embodiment, upon retrieving updated real world weather, the weather simulation manager may revert the weather back to real world weather. However, to provide a smooth user experience during game play, the weather simulation manager might not immediately change the current weather for each cell to the updated real world weather. To do so might cause unrealistic weather events and/or confuse the user. Instead, the weather simulation manager may gradually morph each cell's current weather to the retrieved updated real world weather over some predetermined amount of time, e.g., over the next three minutes of game play. This provides a smooth transition back to real weather. After the transition back to real weather, the weather simulation manager may revert back to the user settings to determine subsequent weather changes during each cycle.

In some embodiments, the weather simulation manager might not simulate weather conditions other than temperature and dew point. That is, the weather simulation manager, during each cycle, might not alter other weather conditions such as winds aloft and barometric pressure. Instead, these other weather conditions may be updated at the periodic intervals in which weather is retrieved from the database over the Internet.

Thus, using the methods and systems described above, the weather simulation manager can provide dynamic weather based on real weather, based a user's individual weather settings, or any combination thereof. The weather simulation manager can simulate real world weather, making the user feel part of a larger world, or weather that changes more or less dramatically than real world weather. By independently simulating weather for each cell in a geographic grid, a variety of weather types may be simulated simultaneously, further increasing the realistic look and feel of the simulated weather.

Weather Profiles

As described above with reference to FIG. 6, a user may select a predefined weather profile, also referred to as a weather theme, based on which the simulated weather is initiated. Weather profiles use basic weather characteristics, e.g., temperature, pressure, cloud type, base and height, precipitation type and rate, etc., to provide interesting and challenging sets of weather conditions to a user. Weather profiles may be provided with the computer game or provided at a later time via a third-party developer, e.g., using the weather profile creation tool described below.

A weather profile may include a data structure that stores weather over a location neutral geographical space, which may subsequently be applied to any selected geographical space in a simulated environment. That is, a weather profile is a collection of predefined or predetermined meteorological data that a computer game, e.g., Flight Simulator® 2004 by Microsoft Corporation of Redmond, Wash., uses to define weather conditions (e.g., temperature, wind, icing) and to render weather visuals (e.g., clouds, precipitation, fog). The data structure storing weather profile data may include a regular grid of weather observations where each observation affects a predefined area, e.g., 256 square kilometers (a square with 16 kilometers per side). Weather profiles may contain anywhere from a single observation (i.e., a single 256 km$^2$ cell) to an array of many cells in a two-dimensional array. The weather profile array need not be square, but it may be if desired. In one illustrative embodiment, the weather profile array may be as large as 32×32 cells, allowing a user to create a rich, dynamic weather experience that covers an area of 262,512 square kilometers. The maximum size of each weather profile array is limited only by available computer resources (e.g., storage, processor speed, etc.). A weather profile may follow a given theme, as discussed above, where each cell in the array follows a pattern or corresponds to a certain type of weather. Alternatively, a weather profile may store weather where each cell in the array is unrelated to other cells and/or contains random weather observations.

Figure 12:
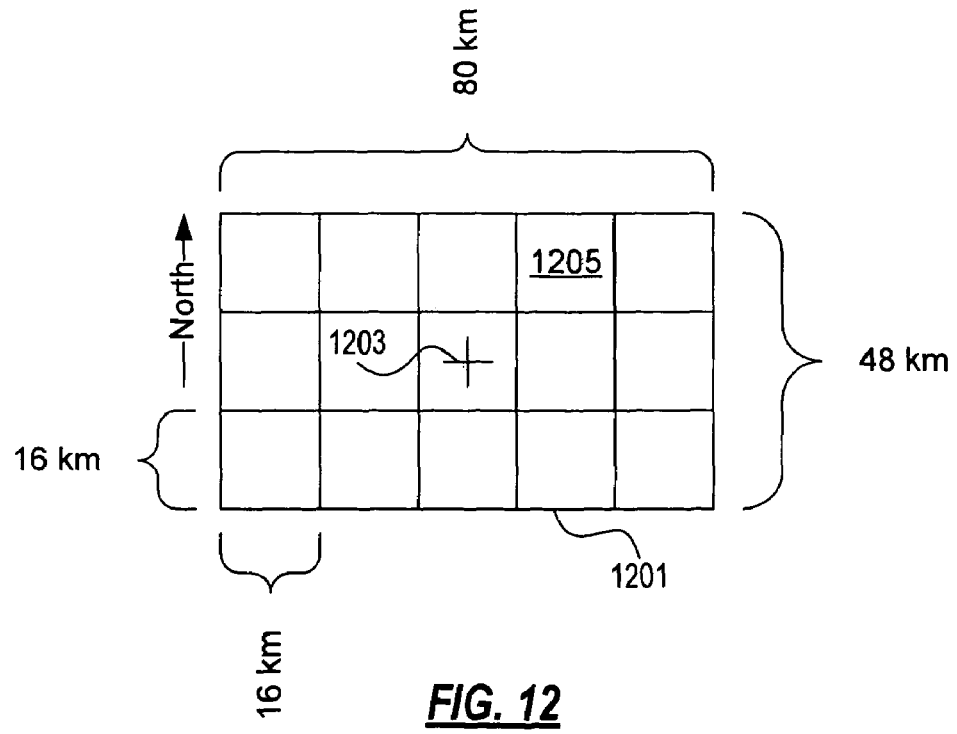
FIG. 12 illustrates a weather profile array according to an illustrative aspect of the invention.

FIG. 12 illustrates a weather profile array 1201 that is 5 cells wide by 3 cells long, thus covering an area of 3,840 square kilometers, based on the present example. A user can define unique weather for each individual cell in the array 1201, e.g., by defining attributes listed in Table 2, below. Weather profile arrays may be oriented in any direction; however, in the present example all weather profile arrays are oriented with North to the top, as shown in FIG. 12. When a computer game loads a weather profile array, the weather profile array may be loaded centered on a user's initial starting position 1203, or based on some other predetermined position, and overwrites the weather in the grid cells in the grid 307 (FIG. 3) around the user, as described above. The weather profile data, when loaded, may be biased around the user's starting elevation, rendering weather based on ground level elevation. This is so that if the profile specifies clouds at 3,000 feet and the user specifies a starting location of Denver, Colo., which has an elevation of greater than 5,000 feet, the computer game renders the clouds 3,000 feet above ground level, rather than below the ground at 3,000 feet above sea level.

The weather array is preferably applied at the user's starting location and does not travel with the user as the user moves. That is, the user can move through the defined weather profile, but the loaded weather profile data preferably remains in the cells in which it is originally loaded. For example, if a user loaded a "Major Thunderstorm" profile in Chicago, the computer game would render and the user would see the thunderstorm around the starting location in Chicago. However, if the user flew to Florida, the thunderstorm would remain in Chicago and would not follow the user. There may be a global or default set of weather conditions associated with each weather profile that describes the default weather outside of the array boundaries. This allows a user to interact with predefined weather, although having less granular detail, even after he or she has flown out of the originally defined profile area. In the example of Major Thunderstorms around Chicago, the weather might be very detailed with interesting variation in clouds and winds every 16 km within the weather profile array. When the user flies outside the original array size of 256 km×256 km, he or she flies out of the extents of the weather profile, so the global set of weather conditions may be used. The global weather may indicate overcast skies in keeping with the profile, the global weather may indicate sunny skies indicating the user has emerged from the storm, or the global weather may indicate any other default weather conditions as desired.

Figure 13:
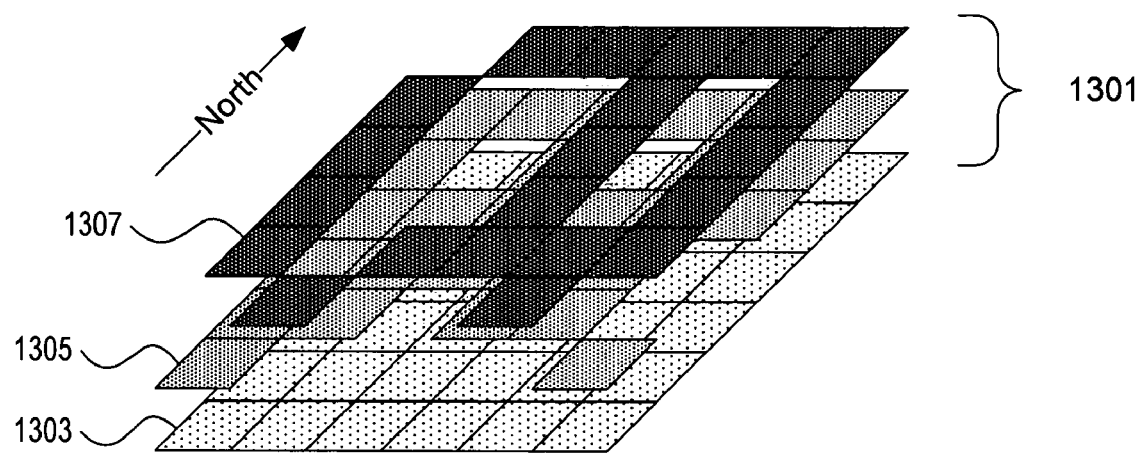
FIG. 13 illustrates layers of a weather profile array according to an illustrative aspect of the invention.

While the weather profile array 1201 is represented in two-dimensions, each cell 1205 may include multiple layers of information. That is, a profile array cell 1205 may include information specifying one set of surface conditions (e.g., wind, temperature/dew point, visibility) and one or more sets of aloft conditions (e.g., wind, clouds, temperature, at varying altitudes). FIG. 13 illustrates an example of a weather profile array 1301 six cells wide by six cells long, thus covering an area of 9,216 km$^2$. Each cell has surface conditions layer information 1303. Some cells have a first layer of information 1305 and some cells have a second layer of information 1307.

It should be appreciated by those of skill in the art that FIG. 13 is illustrative only. Layers for each cell may occur at arbitrary heights as defined by the weather profile array, as opposed to predetermined altitude heights as is implied in FIG. 13, and each cell need not have the same layers. In addition, each cell need not have first layer 1305 in order to have second layer 1307, and vice versa. It should further be appreciated that layers need not be limited to an altitude, but rather may correspond to a type of weather information. That is, according to one illustrative embodiment there may be a surface condition layer, zero or more cloud layers, zero or more temperature layers, zero or more wind layers, and zero or more visibility layers. For example, a first layer may indicate high cirrus clouds at a selected altitude; a second layer may indicate winds at 3,000' above ground level; a third layer may indicate the temperature from 10,000'-12,500' above ground level (e.g., indicating a temperature inversion). Layers may indicate weather conditions at specific altitudes (in either above sea level or above ground elevations), or layers may specify weather conditions for an altitude band.

When the weather profile array omits a type of weather layer (e.g., it has no visibility layer), a default weather setting for that weather type may be used (e.g., infinite visibility when no visibility layer is included). It is when the layers are rendered together by the computer game in the simulated geographical environment that the three-dimensionality of the weather takes shape.

The information stored in each cell may vary depending on the computer game in which the weather is applied. For example, when being used with Flight Simulator® 2004, the information stored in each cell may include weather information corresponding to conditions represented in the Advanced Weather Dialog, illustrated in FIGS. 8-11, or attributes shown in Table 2. When used in conjunction with other computer games, different weather conditions may be stored in each cell as applicable.

Figure 6:
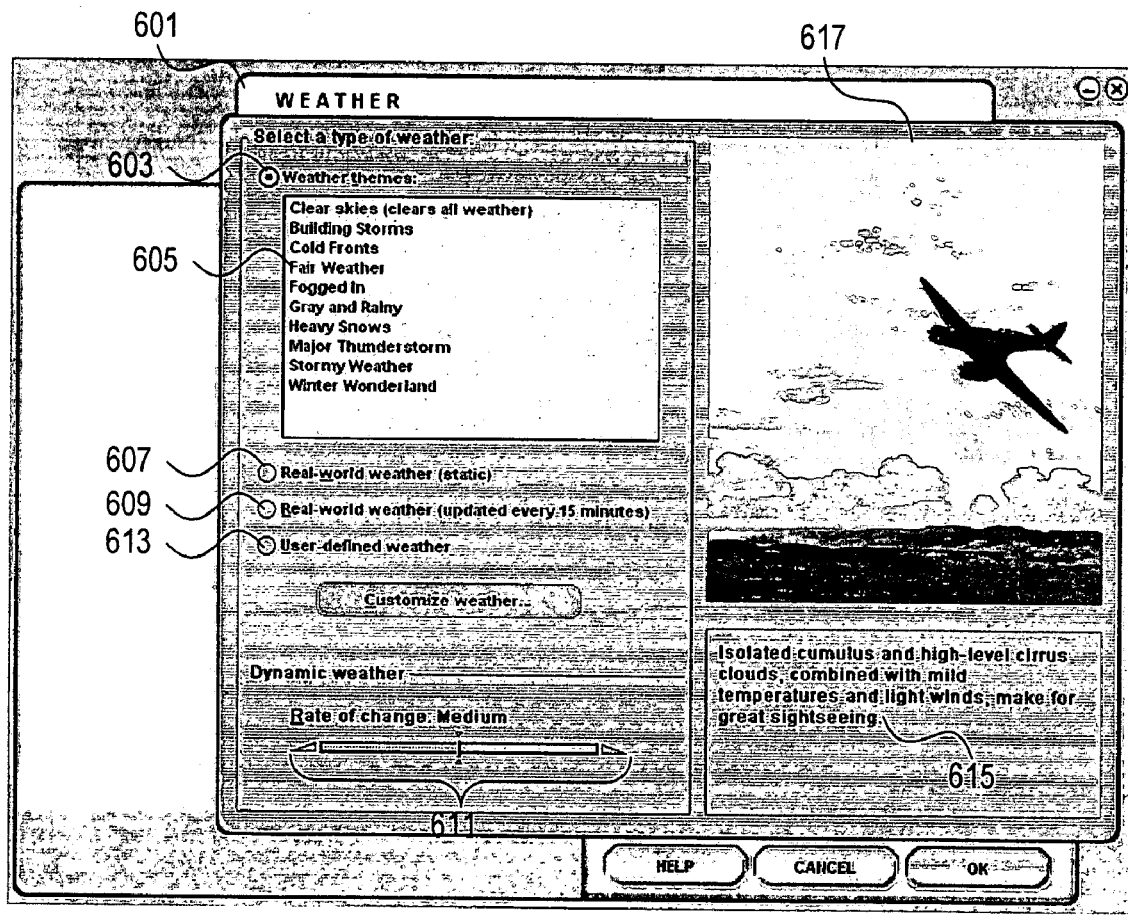
FIG. 6 illustrates a weather initialization menu according to an illustrative embodiment of the invention.

Each weather profile may be stored in one or more data files independent of the computer game with which the weather profile is intended to be used. This allows weather profiles to be created and distributed independently of the computer game if desired. In one illustrative embodiment, each weather profile may comprise three separate files:

1) A profile description text file, stored with the extension .WT, may be used to store the title 605 and description 615 of the profile to be displayed in the Flight Simulator® 2004 Weather dialog 601, illustrated in FIG. 6.
2) A profile data file, stored with the extension .WTB, is a binary file storing the weather profile array in a format that can be loaded by a computer game, e.g., Flight Simulator® 2004 in the present example.
3) A profile image file may store a graphic 617 that is displayed in the Weather dialog 601 when a user selects the associated profile from the profile list. The image may be stored in any conventional format, e.g., a 280×332 pixel, 24-bit color bitmap (.BMP). The image file may be optional. If no image is provided, a default image may be used.

Each of the three files preferably has the same name with different extensions. This is one way in which the computer game associates the three files together. Alternative association methods may be used, as is known in the art, e.g., having a master profile file with a predetermined extension (.WTH), which lists the files necessary for that weather profile. In some embodiments, all profile files may be stored in a predetermined folder or directory, e.g., in a \weather\profiles subdirectory off of the computer game's root installation directory.

Subsequent to loading the weather profile around a user's starting position, the computer game may simulate weather as it otherwise would. That is, the weather profile might only define initial weather conditions, and the weather is subsequently dynamically modeled as described above. Depending on the size of the geographic area in which the computer game simulation is run, the weather profile array may be smaller than the geographically simulated area. In such scenarios, various options may be used to simulate weather when the user travels beyond the area of the weather profile array. In a first embodiment, the weather profile array may be tiled across the simulated geographical area, centered around the user's starting position. Each "tile" may comprise a duplicate weather profile array, or may comprise a mirror-image thereof (north-south mirror image, east-west mirror image, or north-south and east-west mirror image). In another embodiment, weather beyond the weather profile array may revert to default weather conditions outside the weather profile array, as discussed above. In yet another embodiment, weather beyond the weather profile array may revert to real world weather.

Figure 14:
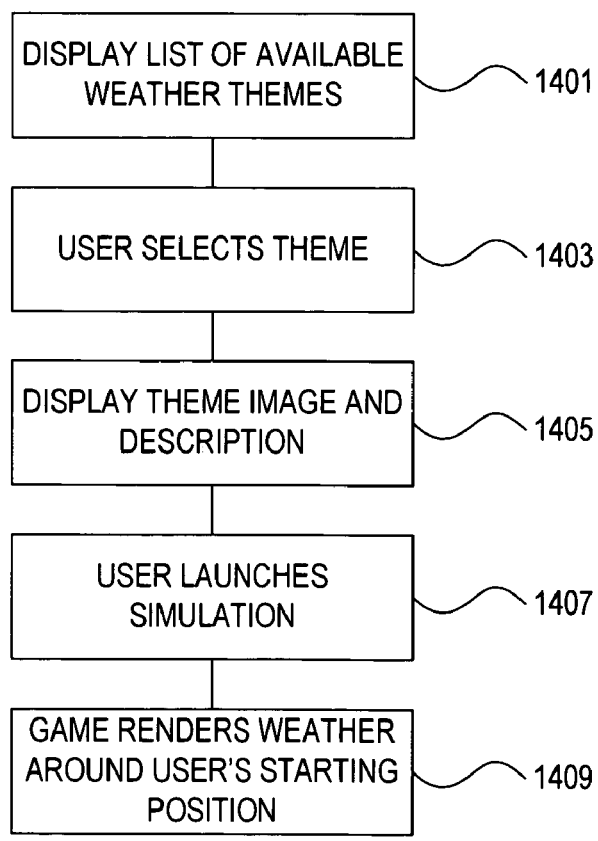
FIG. 14 illustrates a flowchart for providing a weather profile to a user according to an illustrative aspect of the invention.

FIG. 14 illustrates a method of applying a weather profile defined in an arbitrary space to a simulation computer game. In step 1401, the computer game displays a list of available weather profiles. The list of available weather profiles may include weather profiles that are included with the computer game, as well as independently created and/or distributed weather profiles identified by the computer game as described above. In step 1403, a user preliminarily selects a weather profile, in response to which the computer game displays the associated image and description in step 1405. The user, having confirmed the weather profile based on the image and description, subsequently launches the simulation portion of the computer game in step 1407. The computer game then renders the weather from the arbitrarily defined weather profile array centered around the user's starting position within the simulation in step 1409.

Using weather profiles as described above, a simulation computer game can provide predetermined weather to any selected space within the simulated environment. For example, profiles depicting building storms, cold fronts, fair weather, foggy weather, gray and rainy weather, snowstorms, thunderstorms, and the like may be created independent of the geographical area to which they are applied, allowing a user to select a detailed weather scenario for the computer game simulation. Weather profiles also allow a user to have a rich, dynamic weather experience without requiring an Internet connection to otherwise receive real-world weather updates. Weather profiles also allow a user to simulate weather conditions in a location in which they might not otherwise occur (e.g., snow in the Sahara desert).

Figure 15:
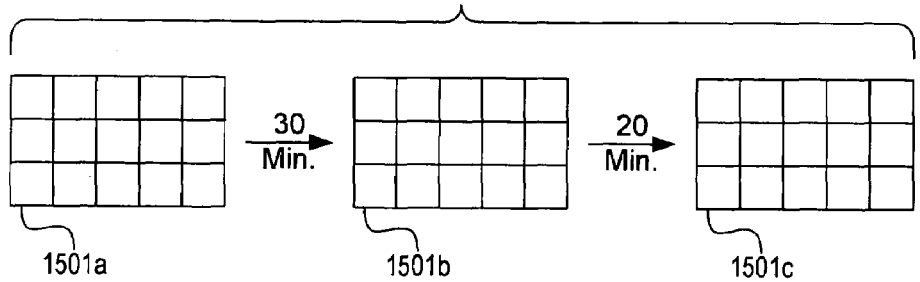
FIG. 15 illustrates a timed weather profile array according to an illustrative aspect of the invention.

According to another aspect of weather profiles, with reference to FIG. 15, another dimension may be added to the weather profile array 1501, depicting time. A timed weather profile array 1501 provides "snapshots" of the weather at relative points in time. Weather profile array 1501*a* may depict initial weather conditions when a user begins the simulation. Weather profile array 1501*b* may depict weather conditions at a predetermined time subsequent to the initial weather conditions, e.g., thirty minutes subsequent to the initial weather conditions. Weather profile array 1501*c* may depict weather conditions at a predetermined time subsequent to the weather conditions of array 1501*b*, e.g., twenty minutes subsequent to the weather conditions of array 1501*b*. The time-dimension of the weather profile array 1501 may or may not proceed in regular intervals of time, and the time interval can optionally be specified by a variable associated with each weather profile array "snapshot". The master weather profile array 1501 may have a default time of day associated with it, e.g., 8 A.M., to provide a default time setting on which sunlight, etc., can be based, if the user does not otherwise specify a preference when the profile is loaded against a specific location in the simulated environment.

Using the timed weather profile array 1501, weather profile designers can model specifically how weather changes over time, instead of relying on the dynamic weather simulation described above. For example, weather may smoothly morph between successive weather profile arrays over the interval time, for example, from the weather defined in weather profile array 1501*a* to the weather defined in weather profile array 1501*b* over thirty minutes, and then successively from the weather defined in weather profile array 1501*b* to the weather defined in weather profile array 1501*c* over the next twenty minutes.

Using a timed weather profile array, a weather profile designer can more accurately model moving weather fronts and known weather events. That is, the weather profile designer can accurately specify how weather evolves over time, instead of relying on dynamic weather simulation. For example, suppose an individual was flying on an actual airplane flight to Ronald Reagan Washington National Airport (DCA) on Nov. 29, 2003 when a weather phenomenon at the airport caused major unexpected crosswinds forcing many flights to abort landings at the last minute. A weather profile designer could subsequently create a timed weather profile based on actual weather conditions reported by the DCA weather station at known times during the time period in question. The individual on the actual flight could then download the timed weather profile, select the timed weather profile in the computer game (e.g., Flight Simulator® 2004), and select DCA as the starting airport. The computer game then renders the weather around DCA and the individual can simulate flying through the weather conditions through which the individual actually flew. Other historical weather profiles can be created such as based on a specified time allocation during a hurricane, tornado, or other significant or interesting weather event.

Weather Profile Creation Tool

Each weather profile array may provide varying amounts of weather detail, depending on the complexity of the weather profile and the amount of time spent in creating the weather profile. For example, a weather profile designer may design a simple weather profile in just a couple minutes, providing, e.g., a single cloud layer above the surface conditions, and duplicating those same surface conditions and cloud layer for each cell within the weather profile array (e.g., 4×4 cells in the array). Alternatively, a weather designer can design a more complex weather profile, including surface conditions, multiple cloud layers, multiple winds aloft layers, multiple visibility layers (e.g., simulating low altitude haze during summer), and multiple temperature layers, each different within each cell of a relatively large weather profile array (e.g., 32×32 cells in the array).

In order to more easily create a rich weather profile, weather profile designers may use a weather profile creation tool as described herein. With reference back to FIG. 1, the creation tool may be stored in system memory 130 or non-volatile memory 141, 152, 156 as application programs 135, 145, program modules 136, 146, and/or program data 137, 147. The software may alternatively be stored remotely, such as on remote computer 180 with remote application programs 182. The weather profile creation tool may be part of the overall computer game application, it may be a separate software application, or it may be a network accessible application such as on an ASP model.

Figure 16:
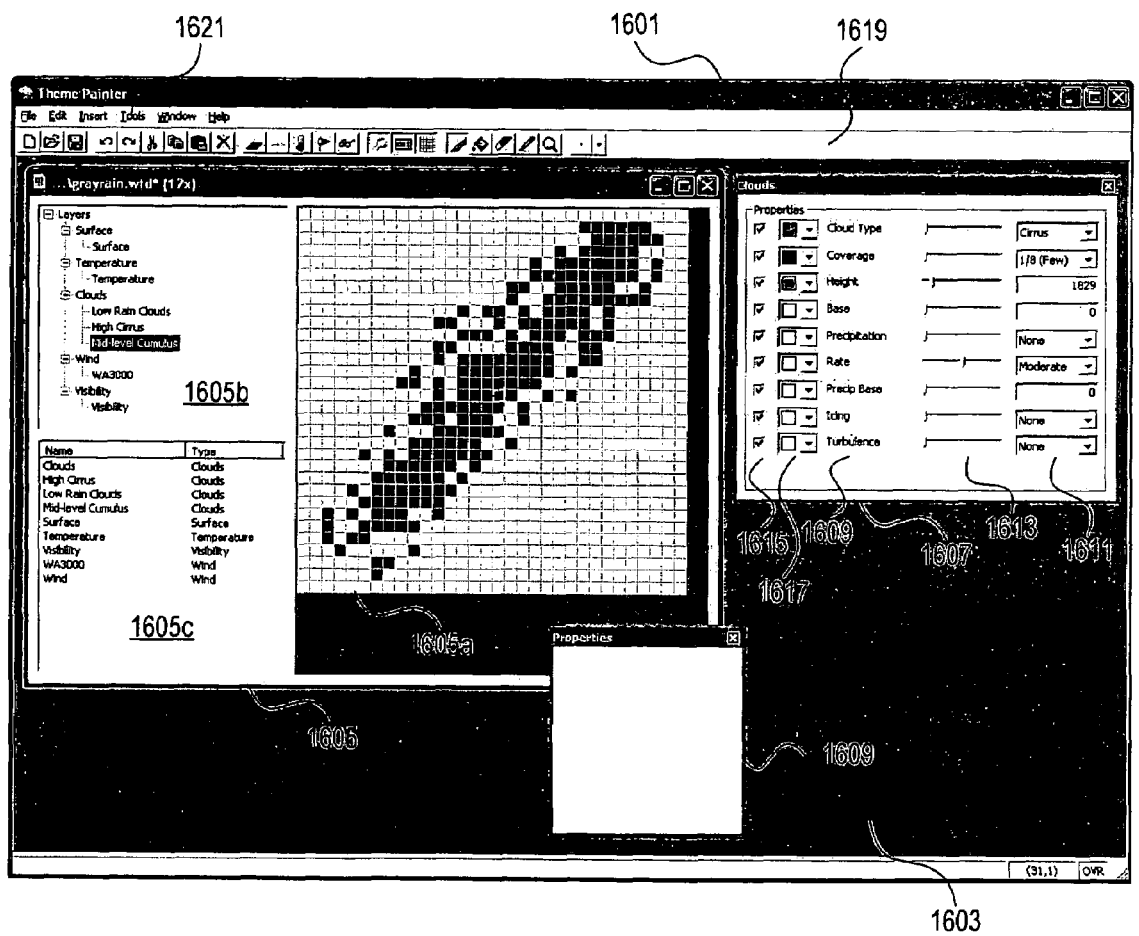
FIG. 16 illustrates a weather profile creation tool user interface according to an illustrative aspect of the invention.

With reference to FIG. 16, a weather profile designer may use the weather profile creation tool 1601 to define multiple layers of atmospheric phenomenon (e.g., clouds, winds, etc.) and set weather conditions and properties by "painting" or "drawing" them onto a two-dimensional grid 1605a representative of the weather profile array. The tool's user interface 1603 preferably changes dynamically based on the type of weather condition the user is defining, enabling the user to choose values for condition-specific data (e.g., wind speed for a wind layer). The profile creation tool may represent data visually by color variation on the grid display. In one embodiment, the weather profile creation tool varies color by mapping the valid range of values for each selected input to up to 256 distinct values in the red, green and blue color channels, and draws the resultant color in the corresponding grid cell(s). This will be described in more detail below.

Figure 24:
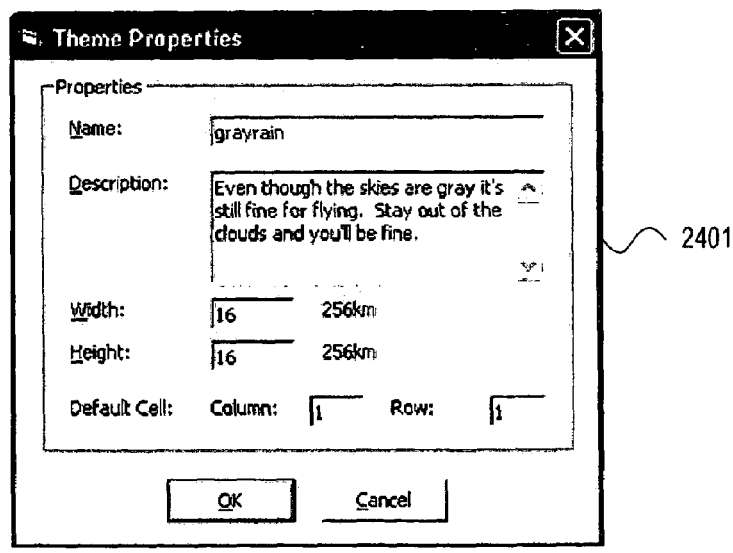
FIG. 24 illustrates a weather profile properties window according to an illustrative aspect of the invention.
Figure 25:
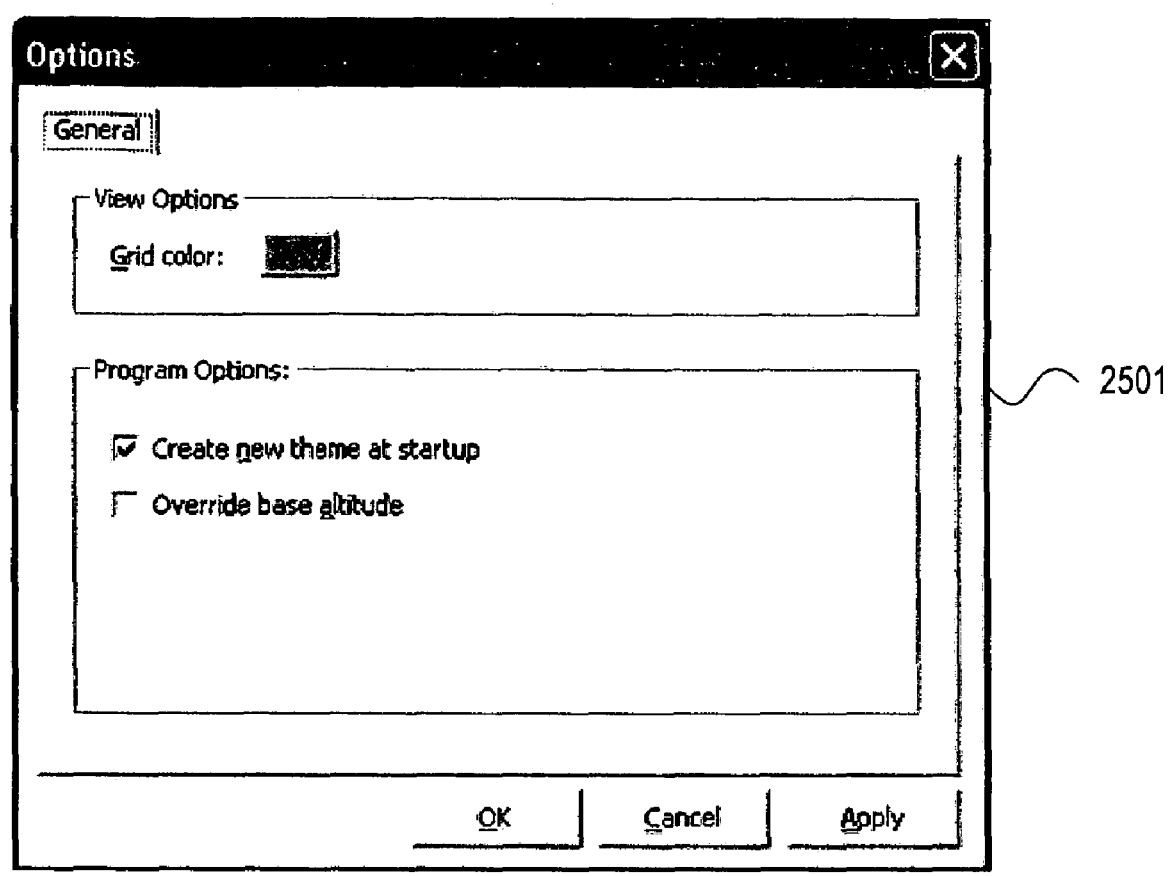
FIG. 25 illustrates an options window according to an illustrative aspect of the invention.

The weather profile creation tool 1601 provides various features and abilities. User interface window 1603 may include three subwindows, each providing additional capabilities. Profile window 1605 illustrates the present weather profile being edited, e.g., "grayrain" in FIG. 16. A first subportion 1605a of profile window 1605 illustrates the profile in graphical format, where each cell represents a single cell of a profile array, e.g., profile array 1201 (FIG. 12), as described above. Cells are shaded when the attributes for that cell have been modified and the palette window 1607 is set accordingly (described further below). Second subportion 1605b hierarchically illustrates the layers present within the weather profile. As shown in subportion 1605b, there is one or more each of a surface layer, cloud layer, temperature layer, wind layer, and visibility layer. Layers may be grouped within their respective layer types, as shown. A third subportion 1605c provides the complete list of layers currently in the weather profile. A user may change the size of the grid and provide other master weather profile properties via a profile properties window 2401, such as is illustrated in FIG. 24, accessible via the File menu. Other options may be available through options window 2501, illustrated in FIG. 25, and accessible via the Tools menu. For example, by selecting the "override base altitude" checkbox, the precipitation base value will be set at the lowest permitted value, e.g., −450 meters, to ensure than precipitation falls all the way to the ground. The lowest permitted value may be negative to account for locations with below sea level elevations, e.g., Death Valley in California.

Figure 17:
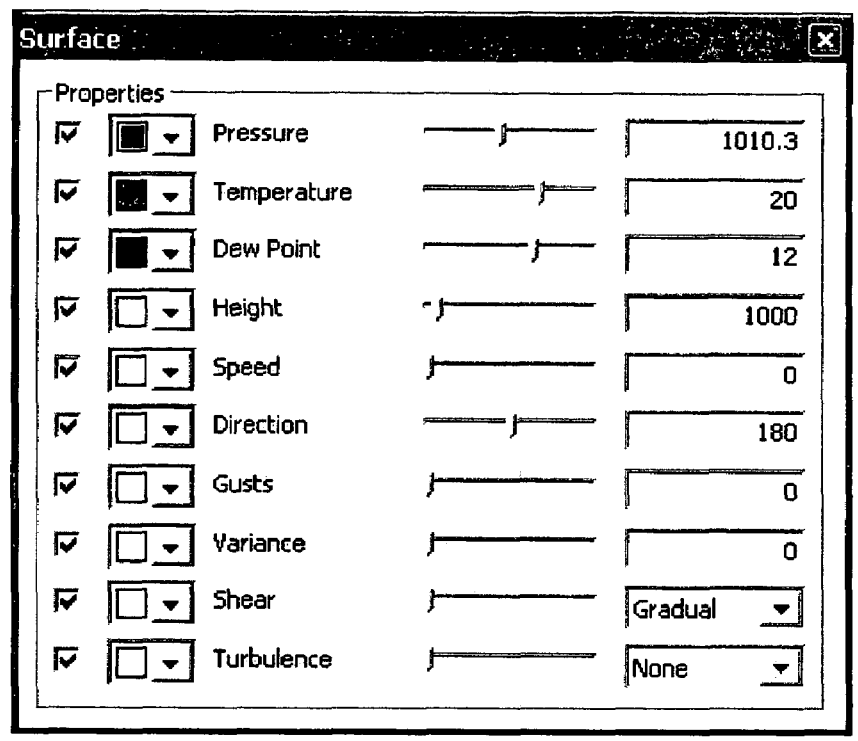
FIG. 17 illustrates a surface attributes window according to an illustrative aspect of the invention.
Figure 18:
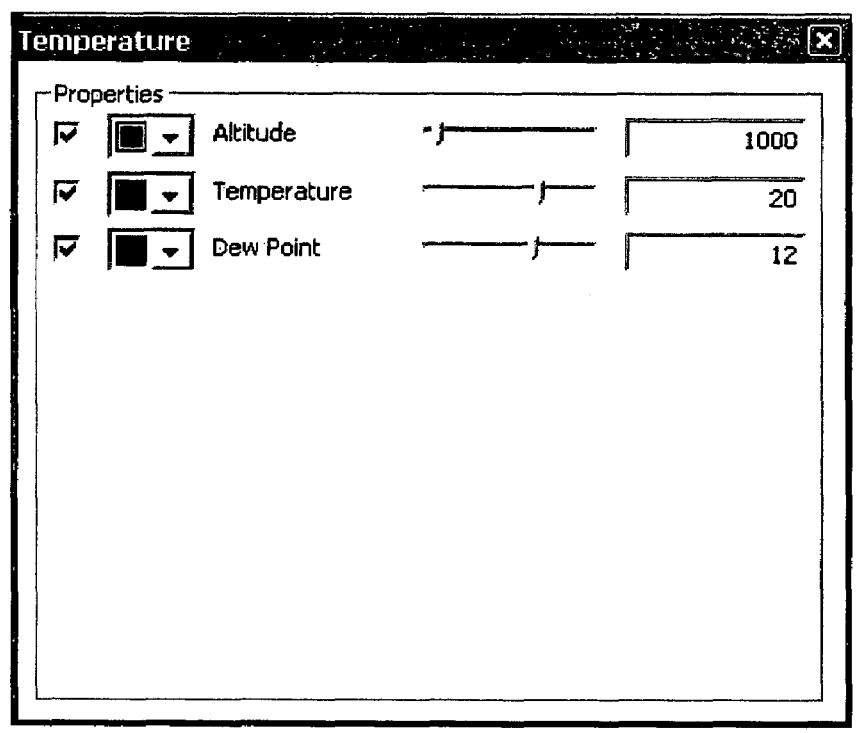
FIG. 18 illustrates a temperature attributes window according to an illustrative aspect of the invention.
Figure 19:
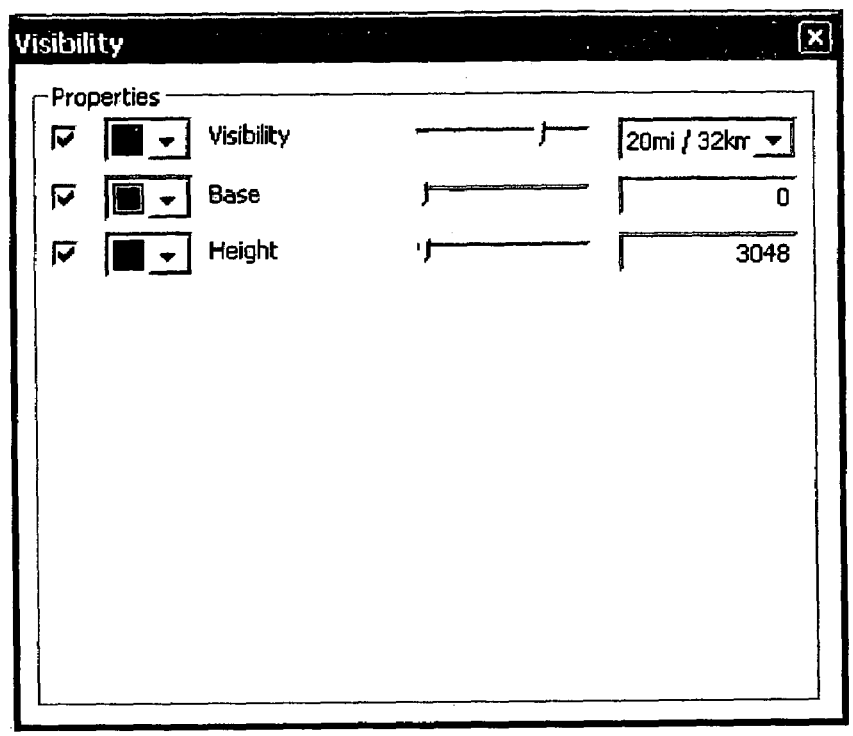
FIG. 19 illustrates a visibility attributes window according to an illustrative aspect of the invention.
Figure 20:
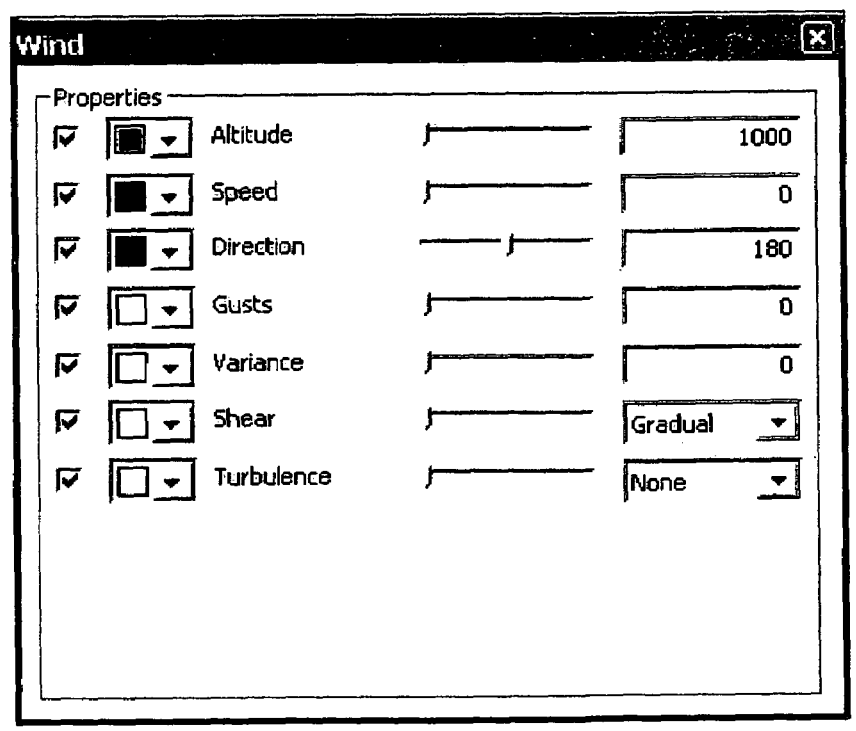
FIG. 20 illustrates a wind attributes window according to an illustrative aspect of the invention.

Palette window 1607 provides the available weather conditions that may be edited based on the selected layer. For example, in FIG. 16, a cloud layer is currently selected in window 1605b, so palette window 1607 contains cloud attributes that may be adjusted. FIG. 17 illustrates a palette window having surface attributes when a surface layer is selected in window 1605b or window 1605c. The surface layer may extend upward to a specified layer height, as shown. FIG. 18 illustrates a palette window having temperature attributes when a temperature layer is selected. FIG. 19 illustrates a palette window having visibility attributes when a visibility layer is selected. FIG. 20 illustrates a palette window having wind attributes when a wind layer is selected. A complete list of attributes and valid values is listed below in

TABLE 2

Those of skill in the art will appreciate that the list in Table 2 is illustrative only, and the actual values used may depend on the capabilities of the computer game with which they are being used.

| Data Type | Attribute | Valid Values | Base-Zero Value |
|---|---|---|---|
| Clouds | Type | Cirrus | 0 |
|  |  | Stratus | 1 |
|  |  | Cumulus | 2 |
|  |  | Cumulonimbus | 3 |
|  | Coverage | 0/8 | 0 |
|  |  | 1/8 | 1 |
|  |  | 2/8 | 2 |
|  |  | 3/8 | 3 |
|  |  | 4/8 | 4 |
|  |  | 5/8 | 5 |
|  |  | 6/8 | 6 |
|  |  | 7/8 | 7 |
|  |  | 8/8 | 8 |

TABLE 2-continued

Those of skill in the art will appreciate that the list in Table 2 is illustrative only, and the actual values used may depend on the capabilities of the computer game with which they are being used.

| Data Type | Attribute | Valid Values | Base-Zero Value |
|---|---|---|---|
| | Height (meters) | 0-20000 | Attr. Value |
| | Base (meters) | 0-20000 | Attr. Value |
| | Precipitation | None | 0 |
| | | Rain | 1 |
| | | Snow | 2 |
| | Rate | Very Low | 0 |
| | | Low | 1 |
| | | Moderate | 2 |
| | | High | 3 |
| | | Very High | 4 |
| | Precipitation Base (meters) | 0-20000 | Attr. Value |
| | Icing | None | 0 |
| | | Trace | 1 |
| | | Light | 2 |
| | | Moderate | 3 |
| | | Severe | 4 |
| | Turbulence | None | 0 |
| | | Occasional | 1 |
| | | Light | 2 |
| | | Moderate | 3 |
| | | Severe | 4 |
| Surface | Pressure (millibars) | 900.0-1154.0 | Attr. Value −900 |
| | Temperature (C.°) | −95-75 | Attr. Value +95 |
| | Dew Point (C.°) | −95-75 | Attr. Value +95 |
| | Layer Height (meters) | 0-20000 | Attr. Value |
| | Wind Speed (knots) | 0-75 | Attr. Value |
| | Wind Direction (degrees) | 0-359 | Attr. Value |
| | Wind Gusts (knots) | 0-50 | Attr. Value |
| | Wind Direction Variance (degrees) | 0-180 | Attr. Value |
| | Wind Shear | Gradual | 0 |
| | | Moderate | 1 |
| | | Steep | 2 |
| | | Instantaneous | 3 |
| | Turbulence | None | 0 |
| | | Occasional | 1 |
| | | Light | 2 |
| | | Moderate | 3 |
| | | Severe | 4 |
| Temperature | Altitude (meters) | 0-20000 | Attr. Value |
| | Temperature (C.°) | −95-75 | Attr. Value +95 |
| | Dew Point (C.°) | −95-75 | Attr. Value +95 |
| Visibility | Visibility Distance (nautical miles) | 1/16 | 0 |
| | | 1/8 | 1 |
| | | 1/4 | 2 |
| | | 1/2 | 3 |
| | | 3/4 | 4 |
| | | 1 | 5 |
| | | 2 | 6 |
| | | 3 | 7 |
| | | 5 | 8 |
| | | 10 | 9 |
| | | 20 | 10 |
| | | 30 | 11 |
| | | 40 | 12 |
| | | 50 | 13 |
| | | Unlimited | 14 |
| | Base Altitude (meters) | 0-20000 | Attr. Value |
| | Height (meters) | 0-240000 | Attr. Value |
| Wind | Altitude (meters) | 0-20000 | Attr. Value |
| | Wind Speed (knots) | 0-75 | Attr. Value |
| | Wind Direction (degrees) | 0-359 | Attr. Value |
| | Wind Gusts (knots) | 0-50 | Attr. Value |
| | Wind Direction Variance (degrees) | 0-180 | Attr. Value |
| | Wind Shear | Gradual | 0 |
| | | Moderate | 1 |
| | | Steep | 2 |
| | | Instantaneous | 3 |
| | Turbulence | None | 0 |
| | | Occasional | 1 |
| | | Light | 2 |
| | | Moderate | 3 |
| | | Severe | 4 |

To change a cell's attributes, a user sets the desired attribute values in the palette window 1607, then selects a cell in window 1605a. Each palette window 1607 (described with reference to FIG. 16 for ease of understanding) provides information for each attribute that may be adjusted. For each attribute that may be adjusted, the information provided may include an attribute name 1609, an attribute value 1611, an attribute slider 1613, a checkbox 1615 and a color value 1617. Attribute name 1609 describes the attribute so that the user knows which attribute is being adjusted.

Attribute value 1611 indicates to the user the attribute value that will be pointed into a cell if the user selects a grid cell. Attribute value 1611 may be selected by clicking the down arrow associated with the attribute value, indicating the user may select from allowable values in a drop down list. Alternatively, when the value is a numeric variable, the user may simply enter the desired value into the attribute value field 1611 for the desired attribute.

Attribute slider 1613 corresponds to attribute value 1611, in that attribute slider 1613 represents the currently selected attribute value relative to the available range of attribute values for the selected attribute. For example, the drop down list for the attribute "Coverage" may provide nine different cloud coverage selections, ranging from 0/8 (clear), 1/8 (few clouds) to 8/8 (fully overcast). When the first option is selected, i.e., 0/8 (clear), then slider 1613 will appear to the far left of the slider bar for that attribute. When the last option is selected, i.e., 8/8 (Overcast), then slider 1613 will appear to the far right of the slider bar for that attribute. When an option in the middle is selected, e.g., 4/8 (Scattered), slider 1613 appears proportionately along the slider bar corresponding to the selected attribute value. In addition to representing the current attribute value, slider 1613 may also be used to adjust the attribute value 1611. Moving the slider correspondingly causes the attribute value 1611 to also change. The attribute slider provides an alternative method for a user to adjust an attribute value, and also provides visual feedback to a user regarding the current attribute value.

Check box 1615 may be used to indicate whether the corresponding attribute will be "drawn" into a profile array cell when a profile array cell is selected by the user. That is, as shown in FIG. 16, each checkbox 1615 is selected for each available cloud attribute. Thus, when the user selects a cell or cells in profile window 1605a, each cloud attribute whose checkbox 1615 is selected will be modified in the selected cell(s). A user can "draw" the attributes whose checkboxes are selected by clicking the mouse button on a cell, or by clicking and holding the mouse button while moving the mouse pointer over numerous cells, similar to how one draws using the utility Microsoft® Paint or other known drawing program.

According to an attribute of the invention, upon drawing the selected attributes into a cell, the weather profile design tool may shade the cell depending on the number of attributes painted into the cell. That is, the weather profile design tool may shade the cell a shade of grey, where the darkness of the shade of grey is dependent on the percentage of the number of available attributes that are actually painted into the cell. For example, if 1 of 9 available attributes (the number of cloud attributes) is painted into a cell, that cell may be shaded a very light shade of grey. If 4 of 9 available attributes are painted into a cell, that cell may be shaded a medium shade of grey. If 9 of 9 available attributes are painted into a cell, that cell may be shaded a dark shade of grey, or black.

According to another aspect of the invention, color value 1617 may indicate the color channel that a weather profile cell should be shaded in profile window 1605*a*, where the intensity of the color channel is based on the attribute value in that cell. In one embodiment of the invention, this may be accomplished by mapping the valid range of attribute values to up to 256 distinct values in the selected color channel (or whatever other maximum color channel value is possible). For example, the Coverage attribute may support nine valid values for cloud coverage: 0/8, 1/8, 2/8, 3/8, 4/8, 5/8, 6/8, 7/8, and 8/8. By dividing 256 by one less than the number of valid options, and then multiplying this result by the base-zero number of the option (i.e., the integer value of the selected choice, starting from zero), the Coverage values can be mapped to color channel intensities as shown in Table 3.

TABLE 3

| Coverage Value | Formula | Color Intensity |
|---|---|---|
| 0/8 | (256/8) * 0 | 0 |
| 1/8 | (256/8) * 1 | 32 |
| 2/8 | (256/8) * 2 | 64 |
| 3/8 | (256/8) * 3 | 96 |
| 4/8 | (256/8) * 4 | 128 |
| 5/8 | (256/8) * 5 | 160 |
| 6/8 | (256/8) * 6 | 192 |
| 7/8 | (256/8) * 7 | 224 |
| 8/8 | (256/8) * 8 | 256 |

Similarly, the Cloud Type attribute may support four valid values for cloud coverage: cirrus, stratus, cumulus, and cumulonimbus. By dividing 256 by one less than the number of valid options, and then multiplying this result by the base-zero number of the option, the Cloud Type values can be mapped to color channel intensities as shown in Table 4.

TABLE 4

| Cloud Type Value | Formula | Color Intensity |
|---|---|---|
| Cirrus | (256/3) * 0 | 0 |
| Stratus | (256/3) * 1 | 85 |
| Cumulus | (256/3) * 2 | 171 |
| Cumulonimbus | (256/3) * 3 | 256 |

Figure 23:
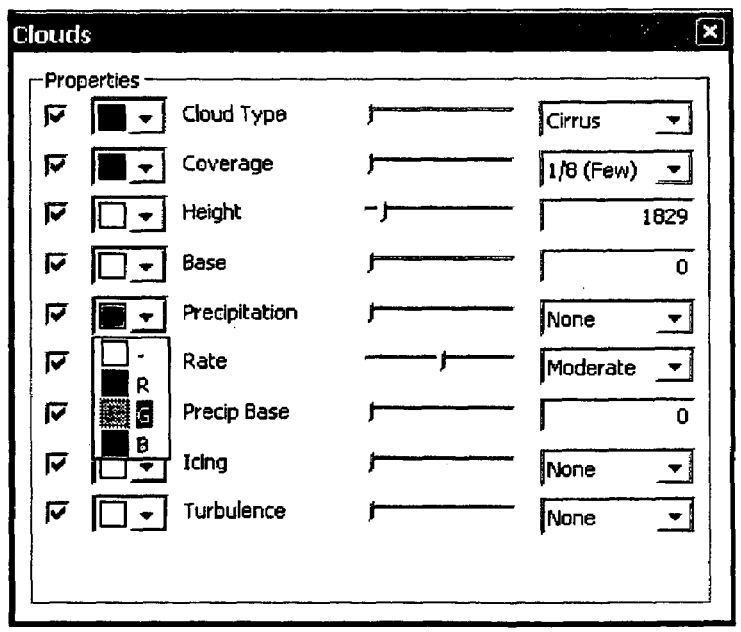
FIG. 23 illustrates a clouds attribute window with a color channel drop down list according to an illustrative aspect of the invention.

The user may decide to map computer selected attributes to color channels, or the user may map other attributes to color channels by selecting a color channel to correspond to the attribute. Attributes can be mapped to color channels regardless of whether the attribute has limited discrete values, or can be an altitude range of 0 to hundreds of thousands of feet. Because there are only three color channels, a maximum of three attributes within a palette window may have associated color channels at any given time. If a user selects a color from the color channel drop down list 1617, as illustrated in FIG. 23, and the selected color is presently associated with another attribute, the weather profile creation tool may reassign that color channel to the new attribute. In addition, when color channels are reassigned, profile window 1605*a* may be updated accordingly. That is, each cell in the profile window 1605*a* may be re-shaded corresponding to the new attribute selected for the changed color channel. In this manner, the user can get a quick visual indication of which cells have modified values (e.g., other than the default value) for the newly selected attribute, based on which cells appears shaded with the corresponding color channel.

According to an aspect of the invention, attribute values' base-zero values may be determined such that the more extreme a weather condition, the higher the resultant color channel value. For example, the value lists for the cloud attributes Coverage, Precipitation, Rate, Icing, and Turbulence, defined above in Table 2, are arranged such that the more extreme the attribute (i.e., more cloudy, worse precipitation, faster icing, more turbulence) the higher the resultant color channel value, if a color channel is associated with any of those attributes. This arrangement results in generally darker colors being displayed in grid 1605*a* for worse weather conditions than for fairer weather conditions, providing acute visual feedback to a weather profile designer regarding the severity of weather presently defined for each cell in the grid.

Figure 21:
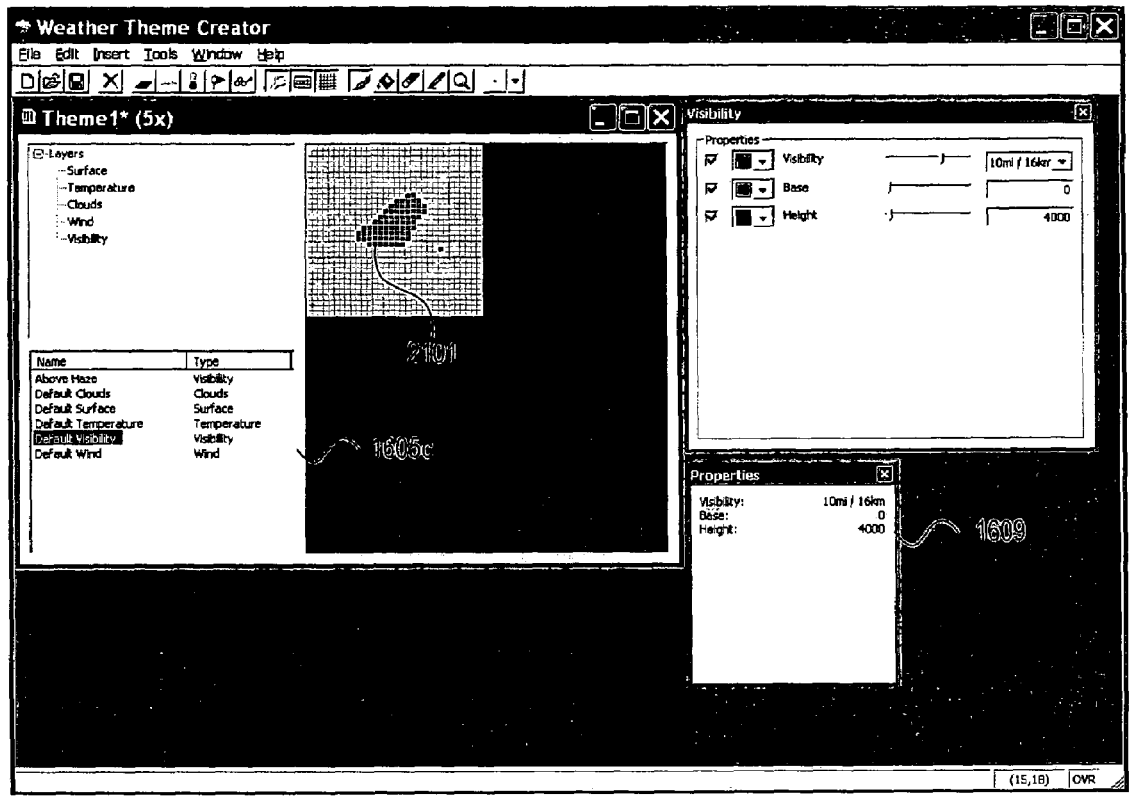
FIG. 21 illustrates the weather profile creation tool with a first visibility layer selected according to an illustrative aspect of the invention.

Properties window 1609 provides details regarding the current attribute values for a selected cell in profile window 1605*a*. When no cell is selected, then no properties are displayed. With reference to FIG. 21, when a cell 2101 is selected, properties window 1609 displays the visibility attribute values associated with cell 2101, because a visibility layer is selected in profile window 1605*c*. If another layer type were selected, then properties window 1609 will display the attributes of the cell 2101 for the selected layer type. FIG. 21 demonstrates a visibility layer having 10 miles visibility between ground level and 4,000 meters above ground level. The Visibility attribute is presently associated with the red color channel, and indicates a red color intensity of 183 (256 divided by one less than the number of discrete Visibility value choices(15)*the base-zero value of the selected choice(10)), the Base attribute is presently associated with the green color channel and indicates a green color intensity of 0 (256 divided by one less than the number of discrete choices*the base-zero value of the selected choice (0)), and the Height attribute is presently associated with the blue color channel and indicates a blue color intensity of 4 (256 divided by one less than the number of discrete choices(240000)*the base-zero value of the selected choice (4000)).

Figure 22:
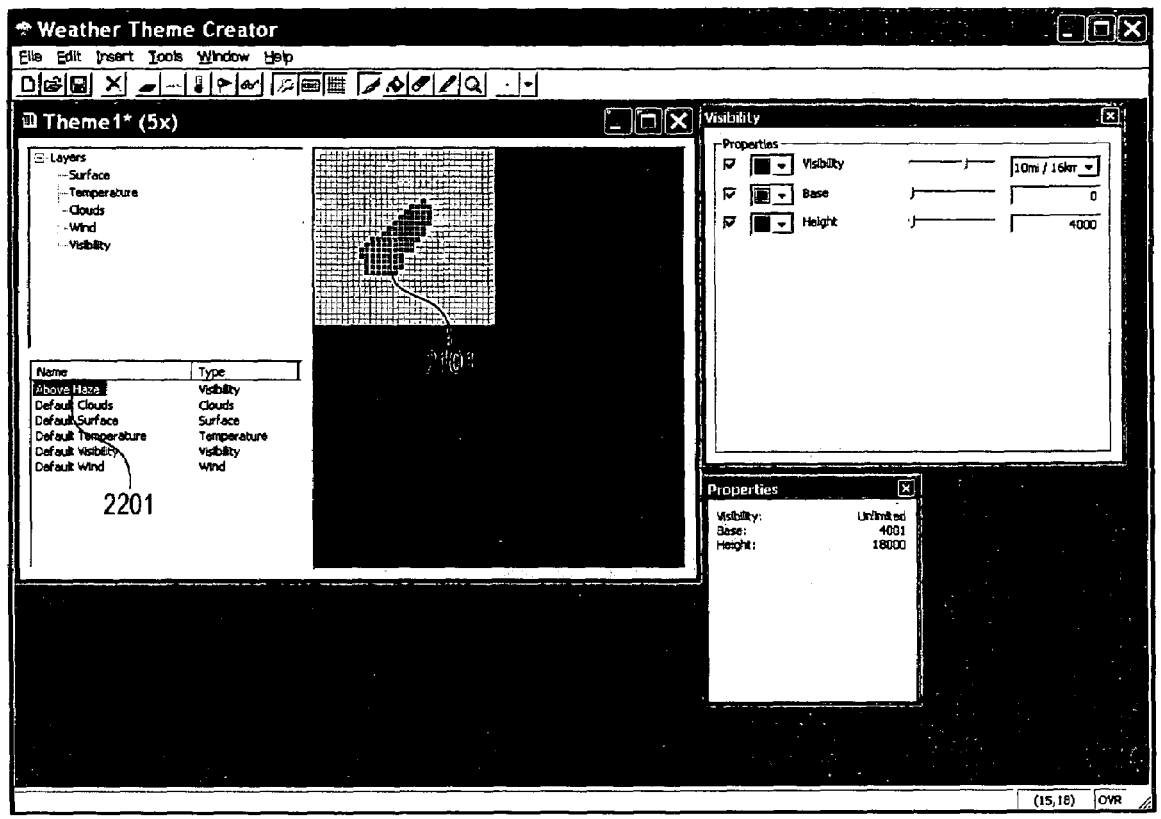
FIG. 22 illustrates the weather profile creation tool with a second visibility layer selected according to an illustrative aspect of the invention.

A second visibility layer is demonstrated with reference to FIG. 22. Properties window 1609 illustrates attribute values for the same cell 2101 for the second visibility layer 2201. Second visibility layer 2201 indicates that above 4,000 meters and up to 18,000 meters there is unlimited visibility. The color channel value for red is 256 (i.e., unlimited visibility is the highest discrete visibility value), so the cell is brighter red in FIG. 22 than in FIG. 21.

With reference back to FIG. 16, a toolbar 1619 may be used to provide shortcut buttons to features most used by a user of the weather profile creation tool 1601. For example, toolbar 1619 may include buttons for New Weather Profile, Open Weather Profile, Save Weather Profile, Undo, Redo, Cut, Copy, Paste, Delete, New Surface Layer, New Cloud Layer, New Temperature Layer, New Wind Layer, New Visibility Layer, Toggle Palette Window, Toggle Properties Window, Toggle Grid, Brush, Fill, Erase, Pickup Attributes, Zoom, and Brush Size. The same or different options may also be accessible via a menu on menu bar 1621, e.g., on a File menu, Edit menu, Insert menu, Tools menu, Window menu, and/or Help menu.

When the user has finished creation of a weather profile, the user may select an Export option which exports the weather profile into a binary data file, e.g., a .WTB file described above, for use with the computer game for which the weather profile was created. Until the exported data file is created, the weather profile data may be stored in another file format that is understandable by the weather profile creation tool. Those of skill in the art will appreciate that the format of the stored data is secondary to the capabilities the data provides.

Using the weather profile creation tool, a user or weather profile designer can quickly and efficiently modify cell attributes to design a rich, dynamic weather profile in much less time than would be required to create the same weather profile manually. The concepts of the weather profile creation tool, namely drawing attributes into a grid representation of a virtual space, while described with respect to weather profiles, are not so limited. Those of skill in the art will appreciate that a similar tool within the scope of the invention can be used to modify attributes of any two-dimensional space for any purpose. For example, a profile designer could use similar concepts to "paint" landscaping, terrain, cities, or other features each having multiple attributes. In addition, those of skill in the art will appreciate that the principles discussed above can be applied to multi-dimensional spaces having more than two dimensions, by displaying and editing in two or three dimensions at a time.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A tangible computer readable medium, other than a modulated data signal, storing computer executable instructions, which when executed perform a computer-assisted method of graphically depicting weather defined in a pre-existing weather profile to a simulated geographical environment in a computer game, comprising:
    a) a computer reading a data structure storing predefined location neutral weather information, wherein the data structure comprises weather information for each of a plurality of cells in a multi-dimensional array, and wherein the weather information for each cell comprises a plurality of layers of weather information;
    b) the computer applying the weather information read from the data structure to a grid within the simulated geographical environment of the computer game based on a user's starting position within the computer game; and
    c) the computer graphically depicting weather in the computer game based on a current position of the user within the grid.

2. The computer readable medium of claim 1, wherein the layers are selected from a set of layer types including a surface conditions layer, a cloud layer, a temperature layer, a wind layer, and a visibility layer.

3. The computer readable medium of claim 2, wherein the weather information for a first cell comprises a plurality of layers including at least two layers of a same layer type.

4. The computer readable medium of claim 1, wherein the multi-dimensional array is a two-dimensional array.

5. The computer readable medium of claim 1, wherein each cell of the multi-dimensional array corresponds to a geographical area of predetermined size.

6. The computer readable medium of claim 5, wherein each cell of the multi-dimensional array corresponds to a square geographical area of 256 $km^2$.

7. A tangible computer readable medium, other than a modulated data signal, storing computer executable instructions for performing a computer-assisted method of graphically depicting weather defined in a pre-existing weather profile to a simulated geographical environment in a computer game, comprising:
    a) a computer reading a data structure storing predefined location neutral weather information, wherein the data structure comprises weather information for each of a plurality of cells in a multi-dimensional array, and wherein the multi-dimensional array comprises a three dimensional array, wherein the first and second dimensions correspond to geographic location, and the third dimension corresponds to time;
    b) the computer applying the weather information read from the data structure to a grid within the simulated geographical environment of the computer game based on a user's starting position within the computer game; and
    c) the computer graphically depicting weather in the computer game based on a current position of the user within the grid.

8. The computer readable medium of claim 7, wherein step c) comprises transitioning the graphically depicted weather within the computer game from the weather information stored in each cell in a first level of the third dimension to the weather information stored in each cell in a second level of the third dimension.

9. The computer readable medium of claim 8, wherein each layer of the multi-dimensional array in the third dimension has a specified elapsed time value, and wherein the transitioning occurs over an amount of time corresponding to the elapsed time value.

10. A data structure stored on a tangible computer readable medium, said data structure, when executed on a computer, identifies weather for simulation in a computer game, comprising:
    for each of a plurality of cells in a first two-dimensional grid, a first data field storing weather information corresponding to an area of predetermined size in a simulated geographical environment of the computer game, said each first data field comprising a plurality of sub-data fields, each sub-data field defining a different weather layer,
    wherein upon a computer executing the data structure, weather based on the stored data is rendered on a display screen for presentation to a user based on the user's starting position within the computer game.

11. The data structure of claim 10, wherein each weather layer is selected from a set of layer types including a surface condition layer, a temperature layer, a cloud layer, a visibility layer, and a wind layer.

12. The data structure of claim 11, wherein for a first cell the first data field comprises a plurality of sub-data fields of the same layer type.

13. The data structure of claim 11, wherein for a first cell the first data field comprises two sub-data fields having weather layers of the same altitude.

14. The data structure of claim 10, said data structure further comprising:
- for each of the plurality of cells in the first two-dimensional grid, a second data field storing weather information corresponding to the area of predetermined size in the simulated geographical environment of the computer game, said each second data field comprising a plurality of sub-data fields, each sub-data field defining a weather layer; and
- an elapsed time data field indicating an amount of time between the weather information of each first data field and the weather information of each second data field.

15. The data structure of claim 11, wherein a first sub-data field comprises a surface condition layer storing atmospheric pressure data, surface temperature data, dew point data, height data, surface wind speed data, surface wind direction data, surface wind gust data, surface wind variance data, surface wind shear data, and surface turbulence data.

16. The data structure of claim 11, wherein a first sub-data field comprises a clouds layer storing cloud type data, cloud coverage data, cloud height data, cloud base data, precipitation type data, precipitation rate data, precipitation base data, icing data, and turbulence data.

17. The data structure of claim 11, wherein a first sub-data field comprises a temperature layer storing altitude data, temperature data, and dew point data.

18. The data structure of claim 11, wherein a first sub-data field comprises a visibility layer storing visibility data, base data, and height data.

19. The data structure of claim 11, wherein a first sub-data field comprises a wind layer storing wind altitude data, wind speed data, wind direction data, wind gust data, wind variance data, wind shear data, and turbulence data.

20. A tangible computer readable medium, other than a modulated data signal, storing computer executable instructions for graphically depicting weather defined in a pre-existing weather profile to a simulated geographical environment in a computer game, comprising:
- a) a computer executing the computer executable instructions by reading a data structure storing predefined location neutral weather information, wherein the data structure comprises a plurality of weather layers for each cell in a two-dimensional array, wherein each cell corresponds to a simulated geographic area of predetermined size, and wherein the plurality of weather layers are selected from a set of layer types including a surface condition layer, a cloud layer, a temperature layer, a wind layer, and a visibility layer;
- b) the computer applying the weather layers read from the data structure to a grid within the simulated geographical environment of the computer game centered on a user's starting position within the computer game; and
- c) the computer graphically depicting weather in the computer game, wherein the graphically depicted weather corresponds to the weather layers of a cell in which the user is currently located within the grid.

* * * * *